US011561314B2

(12) United States Patent
Faber et al.

(10) Patent No.: US 11,561,314 B2
(45) Date of Patent: *Jan. 24, 2023

(54) MULTI-AXIS, SINGLE MASS ACCELEROMETER

(71) Applicant: TGS-NOPEC Geophysical Company, Houston, TX (US)

(72) Inventors: Cornelis A. M. Faber, Voorhout (NL); Andre W. Olivier, River Ridge, LA (US); Lawrence Philip Behn, Houston, TX (US)

(73) Assignee: TGS-NOPEC Geophysical Corporation, Houston, TX (US)

( * ) Notice: Subject to any disclaimer, the term of this patent is extended or adjusted under 35 U.S.C. 154(b) by 405 days.

This patent is subject to a terminal disclaimer.

(21) Appl. No.: 16/721,567

(22) Filed: Dec. 19, 2019

(65) Prior Publication Data

US 2020/0166666 A1 May 28, 2020

Related U.S. Application Data

(63) Continuation of application No. 15/339,276, filed on Oct. 31, 2016, now Pat. No. 10,545,254.

(Continued)

(51) Int. Cl.
*G01V 1/38* (2006.01)
*G01P 15/08* (2006.01)
(Continued)

(52) U.S. Cl.
CPC ........ *G01V 1/3852* (2013.01); *G01P 15/0802* (2013.01); *G01P 15/097* (2013.01);
(Continued)

(58) Field of Classification Search
CPC ........ G01V 1/3852; G01V 1/164; G01V 1/38; G01V 1/3808; G01V 13/00;
(Continued)

(56) References Cited

U.S. PATENT DOCUMENTS 3,307,054 A 2/1967 Shoor
3,706,217 A 12/1972 Slater et al.
(Continued)

FOREIGN PATENT DOCUMENTS

AU 2016344004 A1 5/2017
AU 2016344002 A1 * 5/2018 .......... G01P 15/0802
(Continued)

OTHER PUBLICATIONS

Second Office Action dated Feb. 6, 2020 in connection with Chinese Patent Application No. 201680077142.5, 31 pages including English translation.

(Continued)

*Primary Examiner* — Daniel Pihulic

(57) ABSTRACT

A multi-axis acceleration sensor comprises a frame, a central mass disposed within the frame, and a plurality of transducers mechanically coupled between the frame and the central mass. At least a first set of the transducers are arranged between the frame and the central mass in a manner configured to measure translational and rotational motion with respect to a first predefined axis.

20 Claims, 14 Drawing Sheets

Related U.S. Application Data

(60) Provisional application No. 62/249,095, filed on Oct. 30, 2015.

(51) Int. Cl.
  *G01P 15/097* (2006.01)
  *G01V 1/16* (2006.01)
  *G01V 13/00* (2006.01)

(52) U.S. Cl.
  CPC ............... *G01V 1/164* (2013.01); *G01V 1/38* (2013.01); *G01V 1/3808* (2013.01); *G01V 13/00* (2013.01); *G01P 2015/084* (2013.01); *G01V 2210/1427* (2013.01)

(58) Field of Classification Search
  CPC .. G01V 2210/1427; G01V 1/18; G01V 1/184; G01V 1/186; G01P 15/0802; G01P 15/097; G01P 2015/084
  See application file for complete search history.

(56) References Cited

U.S. PATENT DOCUMENTS

| | | | |
|---|---|---|---|
| 4,348,142 A | 9/1982 | Figour |
| 4,398,417 A | 8/1983 | Shutt |
| 4,500,979 A | 2/1985 | Scott |
| 4,510,802 A | 4/1985 | Peters |
| 4,601,206 A | 7/1986 | Watson |
| 4,711,125 A | 12/1987 | Morrison |
| 4,736,640 A | 4/1988 | Hooks |
| 4,870,290 A | 9/1989 | Deck |
| 4,893,930 A | 1/1990 | Garrett et al. |
| 4,941,243 A | 7/1990 | Cleveland |
| 5,007,292 A | 4/1991 | Crowe et al. |
| 5,046,057 A | 9/1991 | Berni |
| 5,224,380 A | 7/1993 | Paik |
| 5,383,363 A | 1/1995 | Kulmaczewski |
| 5,408,879 A | 4/1995 | Vreeburg et al. |
| 5,512,794 A | 4/1996 | Kuebler et al. |
| 5,572,081 A | 11/1996 | Starck |
| 5,589,828 A | 12/1996 | Armstrong |
| 5,673,330 A | 9/1997 | Chang |
| 5,748,567 A | 5/1998 | Mori et al. |
| 5,767,840 A | 6/1998 | Selker |
| 5,831,164 A | 11/1998 | Reddi et al. |
| 5,866,817 A | 2/1999 | Mori et al. |
| 5,969,268 A | 10/1999 | Sommerfeld et al. |
| 5,996,412 A | 12/1999 | Hansen |
| 5,996,416 A | 12/1999 | Eguchi |
| 5,999,084 A | 12/1999 | Armstrong |
| 6,094,991 A | 8/2000 | Stewart et al. |
| 6,102,802 A | 8/2000 | Armstrong |
| 6,122,965 A | 9/2000 | Seidel et al. |
| 6,135,886 A | 10/2000 | Armstrong |
| 6,160,763 A | 12/2000 | Cole |
| 6,208,271 B1 | 3/2001 | Armstrong |
| 6,222,525 B1 | 4/2001 | Armstrong |
| 6,285,356 B1 | 9/2001 | Armstrong |
| 6,310,606 B1 | 10/2001 | Armstrong |
| 6,343,991 B1 | 2/2002 | Armstrong |
| 6,344,791 B1 | 2/2002 | Armstrong |
| 6,347,997 B1 | 2/2002 | Armstrong |
| 6,349,604 B1 | 2/2002 | Byun et al. |
| 6,351,205 B1 | 2/2002 | Armstrong |
| 6,397,677 B1 | 6/2002 | Kinsley et al. |
| 6,400,303 B2 | 6/2002 | Armstrong |
| 6,404,584 B2 | 6/2002 | Armstrong |
| 6,415,707 B1 | 7/2002 | Armstrong |
| 6,453,745 B1 | 9/2002 | Jalkanen |
| 6,456,778 B2 | 9/2002 | Armstrong |
| 6,469,691 B1 | 10/2002 | Armstrong |
| 6,470,078 B1 | 10/2002 | Armstrong |
| 6,484,578 B2 | 11/2002 | Woodruff et al. |
| 6,496,449 B1 | 12/2002 | Armstrong |
| 6,504,527 B1 | 1/2003 | Armstrong |
| 6,512,980 B1 | 1/2003 | Barr et al. |
| 6,518,953 B1 | 2/2003 | Armstrong |
| 6,529,185 B1 | 3/2003 | Armstrong |
| 6,532,000 B2 | 3/2003 | Armstrong |
| 6,538,638 B1 | 3/2003 | Armstrong |
| 6,539,308 B2 | 3/2003 | Monk et al. |
| 6,559,831 B1 | 5/2003 | Armstrong |
| 6,563,415 B2 | 5/2003 | Armstrong |
| 6,576,103 B2 | 6/2003 | Abramovich et al. |
| 6,662,658 B2 | 12/2003 | Foote |
| 6,662,659 B2 | 12/2003 | Saitoh |
| 6,679,118 B1 | 1/2004 | Esashi et al. |
| 6,693,625 B2 | 2/2004 | Armstrong |
| 6,705,167 B2 | 3/2004 | Kvisteroey et al. |
| 6,810,737 B2 | 11/2004 | Kawai |
| 6,826,960 B2 | 12/2004 | Schaad et al. |
| 6,845,665 B2 | 1/2005 | Geen |
| 6,848,304 B2 | 2/2005 | Geen |
| 6,868,356 B2 | 3/2005 | Nai et al. |
| 6,883,638 B1 | 4/2005 | Maxwell et al. |
| 6,891,621 B2 | 5/2005 | Berg et al. |
| 6,906,700 B1 | 6/2005 | Armstrong |
| 7,066,026 B2 | 6/2006 | Deng |
| 7,084,759 B2 | 8/2006 | Cox et al. |
| 7,104,128 B2 | 9/2006 | Inglese et al. |
| 7,167,413 B1 | 1/2007 | Rouquette |
| 7,178,401 B2 | 2/2007 | Byrd |
| 7,222,534 B2 | 5/2007 | Maas et al. |
| 7,239,577 B2 | 7/2007 | Tenghamn et al. |
| 7,254,093 B2 | 8/2007 | Ray et al. |
| 7,258,011 B2 | 8/2007 | Nasiri et al. |
| 7,298,672 B1 | 11/2007 | Tenghamn et al. |
| 7,310,287 B2 | 12/2007 | Ray et al. |
| 7,345,670 B2 | 3/2008 | Armstrong |
| 7,359,283 B2 | 4/2008 | Vaage et al. |
| 7,360,456 B2 | 4/2008 | Morimoto |
| 7,367,232 B2 | 5/2008 | Vaganov et al. |
| 7,403,448 B2 | 7/2008 | Welker et al. |
| 7,474,591 B2 | 1/2009 | Menard et al. |
| 7,500,395 B2 | 3/2009 | Mori |
| 7,500,406 B2 | 3/2009 | Morimoto |
| 7,503,215 B2 | 3/2009 | Berg et al. |
| 7,561,493 B2 | 7/2009 | Ray et al. |
| 7,594,438 B2 | 9/2009 | Ackerley et al. |
| 7,617,727 B2 | 11/2009 | Watson |
| 7,644,602 B2 | 1/2010 | Umeda |
| 7,656,746 B2 | 2/2010 | De et al. |
| 7,673,515 B2 | 3/2010 | Gan et al. |
| 7,680,620 B2 | 3/2010 | Umeda |
| 7,881,159 B2 | 2/2011 | Hegna et al. |
| 7,883,292 B2 | 2/2011 | Thompson et al. |
| 7,926,614 B2 | 4/2011 | Tenghamn et al. |
| 7,933,165 B2 | 4/2011 | Thompson et al. |
| 8,087,848 B2 | 1/2012 | Thompson et al. |
| 8,117,912 B2 | 2/2012 | Kawakubo et al. |
| 8,176,779 B2 | 5/2012 | Blomqvist |
| 8,199,611 B2 | 6/2012 | Goujon |
| 8,205,498 B2 | 6/2012 | Hsu et al. |
| 8,226,328 B2 | 7/2012 | Thompson et al. |
| 8,256,290 B2 | 9/2012 | Mao |
| 8,266,959 B2 | 9/2012 | Lin |
| 8,342,025 B2 | 1/2013 | Coronato et al. |
| 8,351,298 B2 | 1/2013 | De Kok et al. |
| 8,446,797 B2 | 5/2013 | Olivier et al. |
| 8,453,506 B2 | 6/2013 | Lu |
| 8,674,932 B2 | 3/2014 | Armstrong |
| 8,675,446 B2 | 3/2014 | Gateman et al. |
| 8,838,956 B2 | 9/2014 | Bettger et al. |
| 9,003,885 B2 | 4/2015 | Pan et al. |
| 9,075,165 B2 | 7/2015 | Vageskar et al. |
| 9,081,426 B2 | 7/2015 | Armstrong |
| 9,086,502 B2 | 7/2015 | Martinez |
| 9,176,254 B2 | 11/2015 | Johnstad |
| 9,207,339 B2 | 12/2015 | Beal et al. |
| 9,213,046 B2 | 12/2015 | Wang |
| 9,217,808 B2 | 12/2015 | Yoneshima et al. |
| 9,274,015 B2 | 3/2016 | Schlipf et al. |
| 9,297,920 B2 | 3/2016 | Manin |

(56) References Cited

U.S. PATENT DOCUMENTS

| | | | |
|---|---|---|---|
| 9,310,391 B2 | 4/2016 | Seshia et al. | |
| 9,459,366 B2 | 10/2016 | Henman et al. | |
| 9,488,671 B2 | 11/2016 | Levy | |
| 9,595,833 B2 | 3/2017 | Isfeldt | |
| 9,739,901 B2 | 8/2017 | Marc et al. | |
| 9,770,826 B2 | 9/2017 | Kamiya et al. | |
| 9,778,386 B2 | 10/2017 | Naes et al. | |
| 9,816,886 B2 | 11/2017 | Inazumi | |
| 9,829,594 B2 | 11/2017 | Ray et al. | |
| 9,835,749 B2 | 12/2017 | De Kok et al. | |
| 9,841,434 B2 | 12/2017 | Sonderegger et al. | |
| 9,846,100 B2 | 12/2017 | Klöpper | |
| 9,846,250 B2 | 12/2017 | Rokkan et al. | |
| 9,891,333 B2 | 2/2018 | Valsvik et al. | |
| 9,989,555 B2 | 6/2018 | Keast et al. | |
| 10,274,627 B2 | 4/2019 | Stewart | |
| 10,545,254 B2 * | 1/2020 | Faber | G01V 1/38 |
| 11,204,365 B2 * | 12/2021 | Olivier | G01V 1/30 |
| 2001/0004846 A1 | 6/2001 | Kawai | |
| 2002/0180978 A1 | 12/2002 | Berg et al. | |
| 2003/0079358 A1 | 5/2003 | Nai et al. | |
| 2004/0042341 A1 | 3/2004 | Tenghamn et al. | |
| 2005/0005698 A1 | 1/2005 | Mcneil et al. | |
| 2005/0034519 A1 | 2/2005 | Deng | |
| 2005/0097957 A1 | 5/2005 | Mcneil et al. | |
| 2006/0021436 A1 | 2/2006 | Kapser et al. | |
| 2006/0059991 A1 | 3/2006 | Pristup et al. | |
| 2006/0133202 A1 | 6/2006 | Tenghamn | |
| 2006/0219009 A1 | 10/2006 | Maas et al. | |
| 2006/0230829 A1 | 10/2006 | Byrd | |
| 2006/0245300 A1 | 11/2006 | De Kok et al. | |
| 2007/0039387 A1 | 2/2007 | Jouanet et al. | |
| 2007/0073502 A1 | 3/2007 | Umeda | |
| 2007/0295087 A1 | 12/2007 | Umeda | |
| 2007/0297827 A1 | 12/2007 | Blaine et al. | |
| 2008/0177492 A1 | 7/2008 | Woodmansee et al. | |
| 2008/0253225 A1 | 10/2008 | Welker et al. | |
| 2009/0065289 A1 | 3/2009 | Tenghamm | |
| 2009/0217733 A1 | 9/2009 | Stachow et al. | |
| 2010/0237870 A1 | 9/2010 | Dodds | |
| 2011/0182140 A1 | 7/2011 | Lambert et al. | |
| 2012/0000287 A1 | 1/2012 | Frangi et al. | |
| 2012/0057430 A1 | 3/2012 | Rouquette et al. | |
| 2013/0083622 A1 | 4/2013 | Herrmann et al. | |
| 2013/0088937 A1 | 4/2013 | Sykes | |
| 2013/0088939 A1 | 4/2013 | Edme et al. | |
| 2013/0166374 A1 | 6/2013 | Capuozzo et al. | |
| 2013/0215714 A1 | 8/2013 | Meunier | |
| 2014/0211589 A1 | 7/2014 | Maxwell | |
| 2014/0241122 A1 | 8/2014 | Ponceau et al. | |
| 2014/0247691 A1 | 9/2014 | Martin | |
| 2014/0328138 A1 | 11/2014 | Lambert et al. | |
| 2014/0352431 A1 | 12/2014 | Leclerc | |
| 2015/0049584 A1 | 2/2015 | Ray et al. | |
| 2015/0049587 A1 | 2/2015 | Lawry et al. | |
| 2015/0241215 A1 | 8/2015 | Kim et al. | |
| 2016/0312603 A1 | 10/2016 | Gottlieb et al. | |
| 2016/0341759 A1 | 11/2016 | Yamaji et al. | |
| 2017/0075014 A1 | 3/2017 | Westerdahl et al. | |
| 2017/0123088 A1 * | 5/2017 | Faber | G01P 15/097 |
| 2017/0123091 A1 | 5/2017 | Stewart | |
| 2017/0139070 A1 | 5/2017 | Marc et al. | |
| 2017/0235005 A1 | 8/2017 | Dons et al. | |
| 2018/0304970 A1 | 10/2018 | Hardcastle | |
| 2018/0356550 A1 | 12/2018 | Morris et al. | |
| 2020/0008875 A1 | 1/2020 | Lu | |
| 2020/0049731 A1 | 2/2020 | Dahl et al. | |
| 2020/0088757 A1 * | 3/2020 | Olivier | G01V 1/184 |
| 2020/0166666 A1 * | 5/2020 | Faber | G01V 1/3808 |

FOREIGN PATENT DOCUMENTS

| | | | | |
|---|---|---|---|---|
| AU | 2016344004 A1 * | 6/2018 | | G01P 15/0802 |
| AU | 2016344004 A2 * | 10/2018 | | G01P 15/0802 |
| AU | 2016344004 A2 | 10/2018 | | |
| BR | 112018008393 A2 * | 10/2018 | | G01P 15/0802 |
| BR | 112018008500 A2 * | 6/2019 | | G01P 15/0802 |
| BR | 112021003892 A2 * | 5/2021 | | G01P 1/023 |
| CA | 3003466 A1 | 5/2017 | | |
| CN | 1821808 A | 8/2006 | | |
| CN | 101057160 A | 10/2007 | | |
| CN | 102812382 A | 12/2012 | | |
| CN | 103534612 A | 1/2014 | | |
| CN | 103547895 A | 1/2014 | | |
| CN | 108431637 A * | 8/2018 | | G01P 15/0802 |
| CN | 108431637 A | 8/2018 | | |
| CN | 108474864 A * | 8/2018 | | G01P 15/0802 |
| CN | 108431637 B * | 4/2021 | | G01P 15/0802 |
| CN | 112955752 A * | 6/2021 | | G01P 1/023 |
| CZ | 301217 B6 | 12/2009 | | |
| EP | 0560558 A2 | 9/1993 | | |
| EP | 1292832 A2 | 3/2003 | | |
| EP | 2202540 A2 | 6/2010 | | |
| EP | 3368922 A1 * | 9/2018 | | G01P 15/0802 |
| EP | 3368923 A1 * | 9/2018 | | G01P 15/0802 |
| EP | 3368923 A1 | 9/2018 | | |
| EP | 3850373 A1 * | 7/2021 | | G01P 1/023 |
| GB | 2411722 A | 9/2005 | | |
| GB | 2492642 A | 1/2013 | | |
| GB | 2493837 A | 2/2013 | | |
| JP | H10256144 A | 9/1998 | | |
| JP | 2001-27579 A | 1/2001 | | |
| JP | 2005095998 A1 | 10/2005 | | |
| MX | 2018005422 A | 8/2018 | | |
| RU | 28923 U1 | 4/2003 | | |
| RU | 2276388 C1 | 5/2006 | | |
| RU | 2018119485 A * | 12/2019 | | G01P 15/0802 |
| RU | 2018119488 A * | 12/2019 | | G01P 15/0802 |
| RU | 2733974 C2 * | 10/2020 | | G01P 15/0802 |
| SU | 397868 A1 | 2/1974 | | |
| SU | 1092446 A1 | 5/1984 | | |
| SU | 1187125 A1 | 10/1985 | | |
| WO | 96/06328 A1 | 2/1996 | | |
| WO | 2005095998 A1 | 10/2005 | | |
| WO | 2011091252 A2 | 7/2011 | | |
| WO | 2016170848 A1 | 10/2016 | | |
| WO | 2016206094 A1 | 12/2016 | | |
| WO | 2017075591 A1 | 5/2017 | | |
| WO | 2017075593 A1 | 5/2017 | | |
| WO | WO-2017075591 A * | 5/2017 | | G01P 15/0802 |
| WO | WO-2017075593 A1 * | 5/2017 | | G01P 15/0802 |
| WO | 2017182994 A1 | 10/2017 | | |
| WO | WO-2020056216 A1 * | 3/2020 | | G01P 1/023 |

OTHER PUBLICATIONS

Notification on Results of Patentability Check of Invention issued in Russian Patent Application No. 2018119488/28 dated Jan. 21, 2020, 22 pages including 11 pages of English translation.

First Office Action Issued by the Mexican Institute of Industrial Property (IMPI) for Application No. MX/a/2018/005422 dated Dec. 2, 2020.

Australian Government, Examination Report for Application 2016344004, dated Aug. 13, 2021.

Australian Government, Examination Report for Application 2016344004, dated Sep. 7, 2021.

Chinese Office Action for Application No. 201680077142.5 dated Jul. 21, 2020.

First Office Action dated Jun. 11, 2019 in connection with Chinese Patent Application No. 201680077142.5, 20 pages including English translation.

First Office Action dated Jul. 18, 2019 in connection with Chinese patent application No. 201680077098.8, 28 pages including English translation.

"International Search Report & Written Opinion", dated Feb. 12, 2015, in PCT Application No. PCT/US2014/057784, 10 Pages.

Aldcroft, et al., "Six-degree-of-freedom vibration isolation systems with application to resonant-mass gravitational radiation detectors", Aldcroft, T.L. et al., "Six-degree-of-freedom vibration isolation systems with application to resonant-mass gravitational radiation detectors," Rev. Sci. Instrum. 63 (8), Aug. 1992, pp. 3815-3827, 13 pages.

(56) References Cited

OTHER PUBLICATIONS

Amarasinghe, et al., "A Silicon Micromachined Six-Degree of Freedom Piezoresistive Accelerometer", Amarasinghe, Ranjith et al., "A Silicon Micromachined Six-Degree of Freedom Piezoresistive Accelerometer," IEEE, 2004, pp. 852-855, 5 pages.

Amarasinghe, et al., "Design & Fabrication of Piezoresistive Six Degree of Freedom Accelerometer for Biomechanical Applications", Amarasinghe, Ranjith et al., "Design & Fabrication of Piezoresistive Six Degree of Freedom Accelerometer for Biomechanical Applications," 2004 IEEE, International Conference on MEMS, NANO and Smart Systems, Aug. 2004, Banff, Alberta, Canada, 10 pages.

Amarasinghe, et al., "Design and fabrication of a miniaturized six-degree-of-freedom piezoresistive accelerometer", Amarasinghe, Ranjith et al., "Design and fabrication of a miniaturized six-degree-of-freedom piezoresistive accelerometer," J. Micromech. Microeng. 15 (2005), pp. 1745-1753, 9 pages.

Chen, "Gyroscope Free Strapdown Inertial Measurement Unit by Six Linear Accelerometers", Chen, Jeng-Heng et al., "Gyroscope Free Strapdown Inertial Measurement Unit by Six Linear Accelerometers," Journal of Guidance, Control, and Dynamics, vol. 17, No. 2, Mar.-Apr. 1994, pp. 286-290, 5 pages.

Danish PTO, First Examination Report dated Feb. 15, 2017 in connection with Danish Patent Application No. PA 2016 70237, 9 pages.

EENTEC, "Force Balanced Accelerometer Model EA-120," obtained Jul. 5, 2016 from <http://www.eentec.com/EA-120_data_new.htm>, 3 pages.

EENTEC, "High Resolution Rotation Seismometer, Model R-1," obtained Jul. 5, 2016 from <http://www.eentec.com/R-1_data_new.htm>, 3 pages.

Elboth, Thomas, "Noise in Marine Seismic Data", Series of Dissertations submitted to the Faculty of Mathematics, and Natural Sciences, University of Oslo, Norway, Ch. 9 removed, 141 pages.

Geng, et al., "Six Degree-of-Freedom Active Vibration Control Using the Stewart Platforms", Geng, Z. Jason et al., "Six Degree-of-Freedom Active Vibration Control Using the Stewart Platforms," IEEE Transactions on Control Systems Technology, vol. 2, No. 1, Mar. 1994, pp. 45-53, 9 pages.

International Search Report and Written Opinion dated Feb. 7, 2017 in connection with International Patent Application No. PCT/US2016/059723, 13 pages.

International Search Report and Written Opinion dated Feb. 7, 2017 in connection with International Patent Application No. PCT/US2016/059725, 13 pages.

Jiang, Qi et al., "Simulation and experimental study of a three-axis fiber Bragg grating accelerometer based on the pull-push mechanism", Jiang, Qi et al., "Simulation and experimental study of a three-axis fiber Bragg grating accelerometer based on the pull-push mechanism," Meas. Sci. Technol. 24 (2013), 9 pages.

Nigbor, "Six-Degree-of-Freedom Ground-Motion Measurement", Nigbor, Robert L., "Six-Degree-of-Freedom Ground-Motion Measurement," Bulletin of Seismological Society of America, vol. 84, No. 5, pp. 1665-1669, Oct. 1994, 5 pages.

Reichenbach, Ralf et al., "Micromechanical triaxial acceleration sensor for automotive applications", Reichenbach, Ralf et al., "Micromechanical triaxial acceleration sensor for automotive applications," IEEE 2003, pp. 77-80.

Wang, Yi et al., "What comes up must have gone down: the principle and application of Up-Down Deconvolution for Multiple Attenuation of Ocean Bottom Data", Wang, Yi et al., "What comes up must have gone down: the principle and application of Up-Down Deconvolution for Multiple Attenuation of Ocean Bottom Data," CSEG Recorder, Dec. 2009, pp. 16-20.

European Patent Office, Examination Report for Application 16794487.5 dated Oct. 28, 2021.

* cited by examiner

MULTI-AXIS, SINGLE MASS ACCELEROMETER

CROSS-REFERENCE TO RELATED APPLICATIONS

This application is a continuation of U.S. patent application Ser. No. 15/339,276, entitled MULTI-AXIS, SINGLE-MASS ACCELEROMETER, which claims priority to U.S. Provisional Application No. 62/249,095, filed Oct. 30, 2015, entitled OCEAN BOTTOM SYSTEM, each of which is incorporated by reference herein, in the entirety and for all purposes. This application is related to U.S. Pat. No. 10,274,627 by inventors Peter Graham Stewart and Cornelis A. M. Faber, filed Oct. 31. 2016, and entitled OCEAN BOTTOM SEISMIC SYSTEMS, which is incorporated by reference herein, in the entirety and for all purposes.

BACKGROUND

This application relates generally to geophysical exploration, and more specifically to seismic data acquisition and sensor technologies. In particular, the application relates to sensor systems for marine seismic surveys, including, but not limited to, ocean bottom cables and autonomous seismic node applications.

Seismic survey technologies are commonly used to explore and develop resources for the petrochemical industry. Petrochemical products are ubiquitous in the modern economy, and can be found in everything from oil and gasoline to medical devices, children's toys, and a wide range of other everyday household items. To meet the continuing demand for these products, oil and gas reserves must be accurately located and surveyed, so that these important resources can be effectively managed. As a result, there is an ongoing need for new seismic sensor systems and more advanced exploration technologies.

Scientists and engineers typically utilize seismic wave-based exploration techniques to locate new oil and gas reservoirs, and to survey and manage existing reserves over time. Seismic surveys are performed by deploying an array of seismic sensors or receivers over the region of interest, and monitoring the response to controlled emission of seismic energy via seismic sources such as vibrators and air gun arrays, or explosive detonations. The response depends upon the seismic energy reflected from subsurface structures, allowing the corresponding geological features to be imaged, including mineral reservoirs and other underground structures of interest.

Marine seismic surveys may proceed by towing an array of seismic sensors or receivers behind a survey vessel, with the receivers distributed along one or more streamer cables. A set of air guns or other seismic sources is used to generate seismic energy that propagates down through the water column to the ocean floor (or other bottom surface). A portion of the seismic energy penetrates the ocean floor and is reflected from subsurface structures, then returns back through the water column to be detected in the streamer array. Seismic receivers can also be disposed along ocean-bottom cables, or provided in the form of individual, autonomous seismic nodes distributed on the seabed.

Typical seismic receivers include pressure sensors and particle motion detectors, which can be provided as individual sensor components, or combined together with both sensor types located in close proximity within a receiver module or seismic node. For example, a set of pressure sensors can be configured in a hydrophone array, and adapted to record scalar pressure measurements of the seismic wavefield propagating through the water column or other seismic medium. Particle motion sensors include accelerometers and geophones, which can be configured to provide single-axis or three-dimensional vector velocity measurements that characterize motion of the medium in response to propagating seismic waves.

Geophysical data pertaining to the subsurface structures is acquired by observing the reflected seismic energy with an array of such receiver components. The observed seismic signals are used to generate a seismic image that described the subsurface geology and composition a in and around the survey area. The overall image quality depends not only on signal sensitivity but also noise effects, contributing to the constant demand for more advanced sensor and receiver technologies.

SUMMARY

This application is directed to a multi-axis, single mass particle motion sensor or accelerometer, suitable for use in seismic surveys. For example, a plurality of sensor components can be coupled to a single central mass, providing sensitivity to linear motion in three independent directions, and sensitivity to rotational acceleration about three orthogonal axes. The individual sensor components can be configured to sense the corresponding linear and rotational motions based on dynamic coupling to the mass, including, but not limited to, force-sensitive linear couplings and rotational couplings. The linear and rotational couplings may be preferentially sensitive to either acoustic waves or shear effects, providing for a combined sensor signal with improved vector fidelity, as described herein.

In some embodiments, a seismic sensor comprises a housing or frame and a central mass disposed. The central mass is disposed within the frame, and may define three principal axes. A plurality of transducers can be mechanically coupled between the frame and the central mass, and arranged in pairs coupled to opposing sides of the central mass, along each of the three principal axes.

Depending on application, piezoelectric crystal transducers may be used as the sensing element, with crystals aligned to provide signal sensitivity to shear stress. Electronics can be provided to combine signals from the transducers in each pair, in order to generate output characterizing acceleration and rotation of the frame.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description, including various representative embodiments of the invention, and as illustrated in the accompanying drawings.

DETAILED DESCRIPTION

Figure 1A:
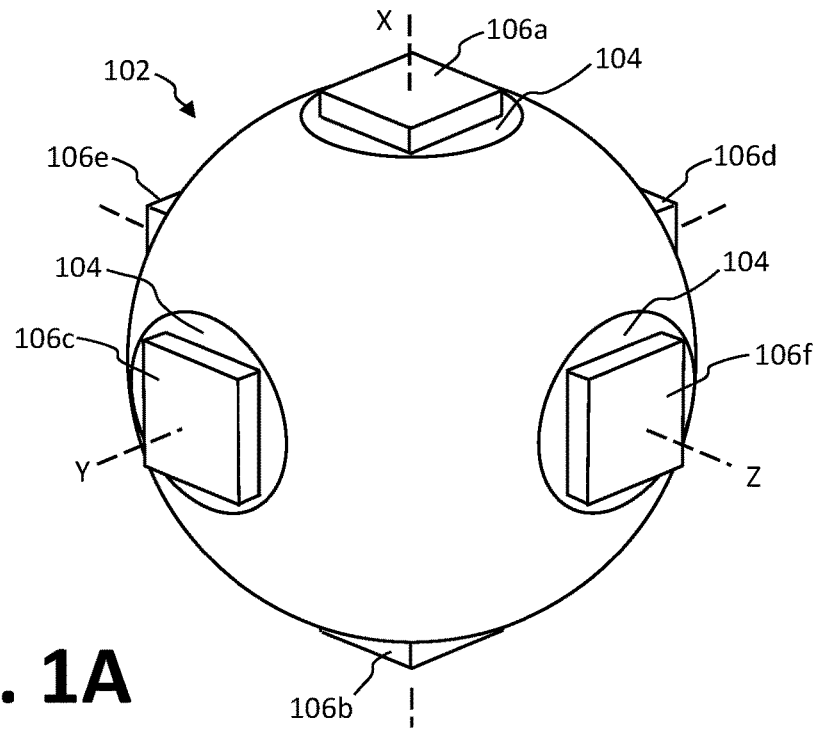
FIG. 1A is an isometric view of a test mass suitable for use in a multi-axis accelerometer.

In this disclosure, reference is made to examples and embodiments of the invention. However, it should be understood that the invention is not limited to these or any other specifically described embodiments. Any combination of the disclosed features and elements, whether related to different embodiments or not, is contemplated to implement and practice the invention. Furthermore, in various examples and embodiments the invention provides numerous advantages over the prior art. Although certain embodiments may achieve these and other advantages over other potential solutions, and over the prior art, whether or not a particular advantage is achieved by any given embodiment is not limiting of the invention as claimed. The following examples, aspects, features, embodiments and advantages of the disclosure are merely illustrative, and should not be considered elements or limitations of the claims, except where explicitly specified in the claim language. Likewise, references to "the invention" shall not be construed as a generalization of any inventive subject matter that is disclosed, and shall not be construed to represent an element or limitation of any claim except where expressly recited therein.

Some embodiments of the invention may be implemented as a program product or executable method for use with a computerized system. Suitable programs may define functions of the various embodiments and methods described herein, and can be provided via a variety of computer-readable media. Illustrative computer-readable media include, but are not limited to: (i) information permanently stored on non-writable storage media (e.g., read-only memory within a computer such as ROM devices or CD-ROM disks); (ii) alterable information stored on writable storage media (e.g., random access or RAM devices, flash memory and other solid-state devices, and magnetic disks or hard drives); and (iii) information conveyed to a computer by a communications medium, such as through a wireless network, including applications, program code and other information downloaded from the Internet or other network. Suitable non-transitory computer-readable media can include instructions that are executable on a computer processor to direct the various functions and method steps of the present invention, as disclosed herein, and also represent suitable embodiments of the present invention.

In general, the routines executed to implement the methods and embodiments of the invention may be part of an operating system or provided as a specific application, component, program, module, object, or sequence of instructions. Computer program applications of the present invention typically comprise a multitude of instructions that can be translated by a computer into a machine-readable format, for example in the form of an executable program. Suitable programs may also encompass parameters, variables and data structures that either reside locally with respect to the program data, or are found in other memory or storage devices. In addition, the various programs and computer-executable methods described herein may be identified based upon the application for which they are implemented, according to any specific embodiment of the invention. It should also be appreciated that any particular nomenclature that follows is used merely for convenience, and the invention should not be construed as being limited to specific applications identified with or implied by such nomenclature.

Multi-Axis, Single Mass Sensors

Figure 1B:
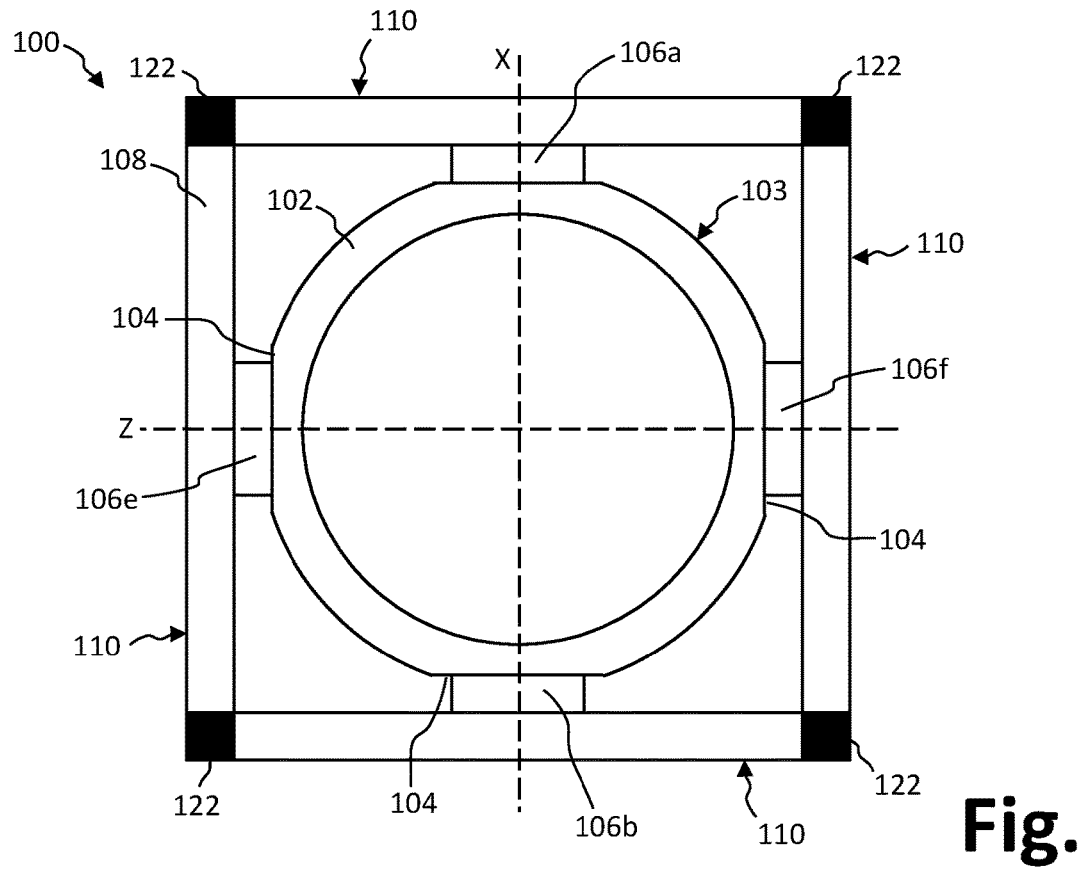
FIG. 1B is a section view of a multi-axis, single mass seismic sensor utilizing a central test mass.

FIG. 1A is an isometric view of a test mass or body 102 for a multi-axis accelerometer or seismic sensor apparatus 100. FIG. 1B is section view of a multi-axis seismic sensor 100 including such a mass 102, e.g. as taken along the X-Z plane of FIG. 1A.

FIGS. 1A and 1B depict representative multi-axis, single mass accelerometer or acceleration sensors 100, with a single (unitary) central test mass or test body 102. In these embodiments, the mass 102 can be represented as a hollow sphere with a number of individual sensor elements or transducers 106a-106f distributed about the perimeter. For example pairs of transducers 106a, 106b; 106c, 106d; and 106e, 106f may be disposed along the principle axes X, Y and Z of the mass, respectively, as shown in FIG. 1A and FIG. 1B.

Other configurations of the mass 102 are also possible, for example a solid sphere or multifaceted shape having symmetry about axes X, Y and Z. Generally, shapes that are symmetrical about one or more axes of translation or rotation are suited for achieving the desired sensory results in an accelerometer, as described herein. Alternatively, the mass 102 may be asymmetric about one or more axes X, Y, Z. Further, the mass 102 could be solid rather than hollow, and formed either of a single substantially uniform material or from one or more different types of core materials and additional layers or components that build out to the outer layer or outer surface 103 of the mass 102. The determinations of whether the body of the mass 102 should be hollow or solid, and homogenous or made of multiple materials and layers, are design choices made to achieve the dynamic requirements of both linear and angular acceleration measurements for a particular environment or application.

Depending on embodiment, one or both of the mass 102 and the outer surface 103 thereof may be formed of an electrically conductive material in order to provide a conductive path for connection with an electrode of a sensor or transducer as described herein. For example, the mass 102 may be formed as a solid or hollow sphere of aluminum, brass, copper, beryllium copper or other conductive material, or the mass 102 may be formed of a ceramic or other insulating material with a conductive coating on the outer surface 103 (e.g., in a gold, aluminum or other conductive metal plated configuration).

Alternatively, one or both of the mass 102 and the outer surface 103 of the mass 102 may be made of a nonconductive or electrically insulating material, e.g., to reduce the effect of stray capacitance on the signal-to-noise (S/N) ratio of the sensor 100, e.g., caused by the conductive area of the mass 102. If such capacitance effects are not suited to a particular application, the mass 102 may be fabricated from non-conductive materials. For example, the mass 102 may be formed as a solid or hollow sphere of a machinable ceramic (e.g., a MACOR material), or from an injection molded plastic.

As shown in FIGS. 1A and 1B, the mass 102 may be formed with a number of sensors or transducers 106a-106f disposed on different attachment surfaces 104. If determination of acceleration and rotational motion is desired with respect to more than one independent direction, the transducers may be disposed along independent (e.g., transverse or orthogonal) axes X, Y, Z. In the embodiment shown in FIGS. 1A and 1B, for example, three pairs of six individual transducers 106a, 106b; 106c, 106d; and 106e, 106f are arranged in opposing pairs coupled to the respective planar attachment surfaces 104, which are positioned at the intersections of perpendicular axes X, Y and Z, and the outer surface 103 of the mass 102.

The attachment surfaces 104 may be adapted to aid in the coupling of the individual acceleration sensors or force transducers 106a-106f to the body of the test mass 102. As shown in FIGS. 1A and 1B, for example, six acceleration sensors 106a, 106b; 106c, 106d and 106e, 106f are affixed to pairs of opposing surfaces 104, in order to sense translational acceleration and rotation of the mass 102 in the three orthogonal directions defined by perpendicular axes X, Y and Z. In particular implementations, piezoelectric crystal transducers 106a-106f may be used to measure the locally-defined force response due to acceleration and rotation of the mass 102, e.g., in response to external torques and forces due to incident seismic energy. In the context of an ocean bottom node (OBN) or other seismic receiver, such forces may be caused by the seismic or acoustical waves propagating through a surrounding water column or other seismic medium. The force transducers or acceleration sensors 106a-106f may be chosen to be highly sensitive to such effects, in order to suitably characterize the response of the test mass or body 102 to the incident seismic energy.

In order to provide a reference structure for measuring movement of the mass 102 by the acceleration sensors 106a-106f, the mass 102 may be suspended within and constrained by a frame or housing 108. In the embodiment shown in FIG. 1B, the frame 108 may be in the form of a symmetrical box or other generally parallel-walled or right prismatic structure.

In some embodiments, the frame 108 may be made of an electrically conductive material. In such configurations, it may be desirable that each frame component or sidewall 110 of the frame 108 be electrically isolated from the other frame components 110 or sidewalls, e.g., using mechanical isolators or insulating couplings 122 disposed between the side members 100 in each respective corner of the frame 108. In other embodiments, the side members 110 of the frame 108 may be made of an electrically insulating material, e.g., if there is a concern that the stray capacitance caused by the conductive area of the frame 108 may impact the signal-to-noise (S/N) ratio of the sensor apparatus 100. If such capacitive effects are not suitable to a particular application, the frame 108 may be fabricated from non-conductive materials.

The radially outer sides of the individual acceleration sensors 106a-106f (disposed opposite the coupling surfaces 104) may be attached to the corresponding side frame components 110 of the frame or housing 108. Thus, the mass 102 will act on the pairs of sensors or transducers 106a, 106b; 106c, 106d; 106e, 106f when moving with respect to and within the frame 108, e.g., with the frame 108 securely fixed to a stationary platform or otherwise constrained to a structure exposed to seismic waves. As the mass 102 is attached to the frame 108 via the acceleration sensors 106a-106f, the translational movement and acceleration of the mass 102 with respect to the frame 108 can be measured by the sensors 106a-106f, with respect to the three orthogonal spatial directions.

In such a configuration, it may be advantageous to select a piezoelectric transducer such as an acceleration sensor 106a-106f that is configured to react to shear stress on opposing sides of the piezoelectric crystal device. Such a transducer registering or responsive to shear stress may provide greater sensitivity due to the configuration of the mass 102 within the frame 108 and the goal of measuring relative acceleration between the two. In some exemplary implementations, the transducer may be a single crystal piezoelectric, for example, a lead magnesium niobate/lead titanate (PMN-PT) crystal, or other suitable transducer.

Piezoelectric elements fabricated from single crystals can exhibit superior seismic sensing properties, relative to polycrystalline elements. Single crystal transducers can also be relatively insensitive to temperature effects, and may have high mechanical energy to electrical energy conversion factors. If a single crystal is cut transverse to the orientation of the crystal alignment, at an appropriate angle, a transducer highly responsive to shear loads and forces (as opposed to tension or compression loads and forces) may be formed.

Figure 1C:
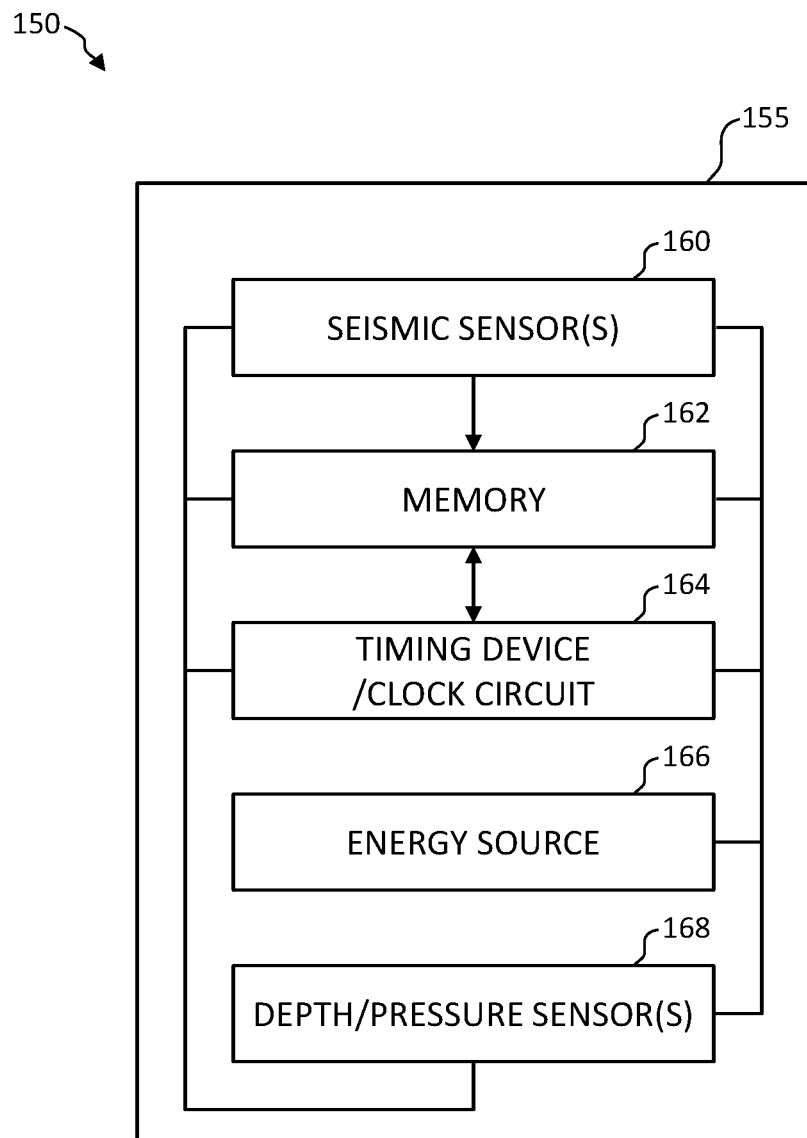
FIG. 1C is a block diagram illustrating a representative modular seismic sensor station or node configured for a multi-axis, single mass seismic sensor.

FIG. 1C is a block diagram illustrating exemplary components of an ocean bottom seismic sensor station or seismic node 150, according to various embodiments of the invention. As shown in FIG. 1C, the seismic receiver or node 150 may include one or more seismic sensors 160 and a memory device 162 disposed within one or more modular housing components 155. The seismic sensors 160 may include any number and combination of multi-axis, single mass seismic accelerometer sensors, as described herein, and other sensors such as hydrophones, geophones, accelerometers, and the like.

In some embodiments, the sensors 160 may include a three-component (3C) sensor configured to measure the three spatial components of seismic waves. In some embodiments, the sensors may measure linear motion, rotation, or both. The seismic sensors 160 may also include digital sensors, for example, a micro electro mechanical system (MEMS) accelerometer. The use of digital sensors may have advantages including the ability to perform automated calibration, reduced manufacturing variance between sensors, improved frequency response, uniform performance in any orientation, and small and compact packaging, among others.

Examples of these and other suitable sensor devices are disclosed in U.S. Pat. No. 6,883,638 by Peter Maxwell et al., entitled ACCELEROMETER TRANSDUCER USED FOR SEISMIC PROSPECTING and filed with priority to Mar. 16, 2009, which is incorporated by reference herein, in its entirety and for all purposes. In some embodiments, the seismic sensors 160 may include piezo-electric sensors. Examples of suitable piezo-electric sensors are disclosed in U.S. Pat. No. 9,294,011 and U.S. patent application Ser. No. 13/984,266 (U.S. Publication No. 2013/0319118) by Ken Kan Deng, both entitled METHOD AND APPARATUS FOR SENSING UNDERWATER SIGNALS and filed with priority to Feb. 7, 2012, each of which is hereby incorporated by reference herein, in the entirety and for all purposes.

The memory 162 is preferably a random access memory or storage medium or other memory component with sufficiently capacity to hold the desired amount of seismic data. While memory 162 is shown as a single entity, it should be understood that memory 162 may in fact comprise a plurality of memory components or modules, and memory 162 may be provided at multiple operational levels, from high speed registers and cache devices to lower speed DRAM chips and other memory components.

In some embodiments, the node 150 may include one or both of a timing device or clock circuit 164 and a power supply or energy source 166. In some embodiments, the timing device 164 may include a resonator, crystal, or oscillator configured to generate a timing signal for recording seismic data. In some embodiments, the timing device 164 may be configured to independently generate a clock signal for the seismic sensor station or node 150. In alternative embodiments, the timing device 164 may be configured to receive an external clock signal from a master clock, and to generate a local clock signal for the node 150 based on the received external clock signal.

The energy source 166 may be configured to provide power to one or more of the sensors 160, memory 162, and other electronic circuits in the node 150. In some embodiments the energy source 166 may include a battery with sufficient capacity to provide power to the seismic node 150 for the desired duration of a seismic survey. Depending on embodiment, power may also be externally provided to the node 150 via a cable or inductive coupling energy source, or otherwise as described herein.

In some embodiments, the node 150 may include one or more depth and/or pressure sensors 168. The depth or pressure sensors 168 can be configured to determine a depth of the seismic sensor station during deployment and/or retrieval. In such embodiments, a threshold depth may be defined for switching the seismic sensor station on or off. For example, during deployment, the sensors, memory and other circuits of the node 150 may not be powered until a threshold depth is reached, as measured by the depth/pressure sensors 168. Similarly, when such a threshold depth is reached during retrieval, one or more circuits of the seismic sensor station may be powered down. By selectively powering one or more circuits of the node 150, these embodiments can conserve power and extend the life of the seismic sensor station during operations to record seismic data.

Figure 1D:
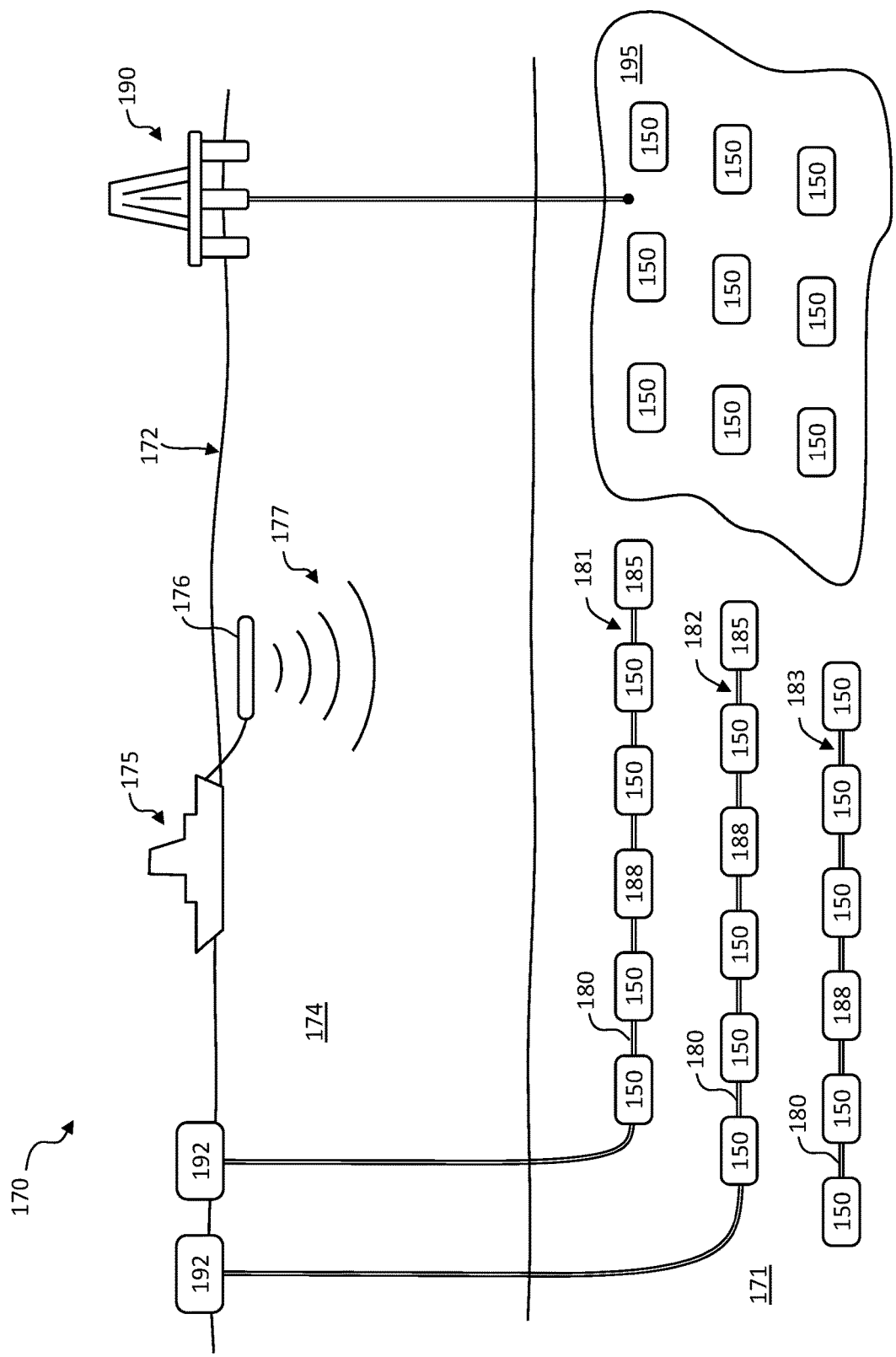
FIG. 1D is a schematic illustration of an exemplary seismic survey utilizing a plurality of modular seismic sensor stations or nodes.

FIG. 1D illustrates an exemplary seismic survey apparatus and method 170 according to various embodiments of the invention. As shown in FIG. 1D, a plurality of autonomous sensor stations or nodes 150 can be deployed on a seabed 171, or similarly below the surface 172 of a water body or water column 174.

As illustrated in FIG. 1D, two or more nodes 150 may be deployed on the sea floor or ocean bed via a respective rope or wire 180. In some embodiments, the rope 180 may be made from a synthetic material with a predefined specific density relative to the water in which it is immersed. In some embodiments, the rope 180 may be a passive rope, e.g., the rope 180 may not include any electrical conductors. In alternative embodiments, the rope or cable 180 can include embedded conductors for communicating one or more of a clock signal, data signals, control signals and power among the individual seismic nodes 150. Thus, the rope or cable 180 may have a passive configuration, absent signal or power communications, or an active configuration, in which signal and/or power connections are provided.

While references are made to a sea floor or seabed in this particular example, the embodiments of the invention are not limited to any particular type of body of water or water column. Rather, different embodiments can be adapted for use in any water, marine or land-based environment, including oceans, lakes, rivers and other geological areas. Accordingly, the use of the term sea, seabed, sea floor, and the like herein should be broadly understood to encompass all bodies of water and other seismic media 174, and any corresponding surfaces 171 suitable for observation of propagated seismic energy by a seismic node or receiver 150.

In particular embodiments, one or more seismic nodes 150 may be deployed to the sea floor or other surface 171 via suitable technology including, but not limited to, a remotely or autonomously operated vehicle (ROV or AUV), or by dropping nodes 150 from a deployment vessel or seismic vessel 175. In other embodiments, autonomous nodes 150 may be equipped with a propulsion system and programmed to navigate through the water column 174 to and from predetermined locations on the sea floor 171. As can be seen in FIG. 1D, deployment of individual seismic nodes 150 without a rope 180 may be advantageous in areas near obstructions, e.g., in a working area 195 of sea floor 171 associated with an oil rig 190 or other operation, in order to avoid the rope 180 coming into contact with and potentially damaging or being damaged by other underwater components and other obstructions during deployment and/or retrieval of the nodes 150.

In some embodiments, rope-deployed seismic sensor stations may be coupled to a hub or buoy 192. For example, the rope segments 181 and 182 are shown coupled to respective hubs 192. While the hubs 192 are shown as provided on floating buoys, this is merely representative and in alternative embodiments one or more of the hubs 192 may be placed on the sea floor 171. Hubs 192 may also be configured to float or be suspended at a predefined depth below the surface 172 or above the sea floor 171, within the water column 174.

In some embodiments, the hubs 192 can include a high precision or "master" clock and communications components configured for data and/or power communications with the nodes 150. For example, a master clock signal from the high precision clock may be transferred to the nodes 150 via conductors in the ropes 180, to facilitate clock correction or to generate a local clock signal at the nodes 150.

In some embodiments, the hubs 192 may also be configured to transfer power, data, and/or control signals to the nodes 150. Accordingly, the hubs 192 may be equipped with power generation and or energy storage devices, and/or control logic for performing quality checks and implementing predefined operating protocols, and the like. In some embodiments, signals sent from the hubs may be used, for example, to recharge sensor station batteries, to perform quality/station health tests, to turn the stations on/off, etc. In some embodiments, the hub devices 192 may be equipped with a global positioning satellite (GPS) device or other positioning or navigational system, and/or a radio transmitter/receiver device in order to facilitate determining location of the hub 192 and/or to facilitate communication with the hub device 192 and the nodes 150.

In embodiments where one or more of the ropes 180 are configured to transfer power and/or data signals, a tail termination device 185 may be provided at an end of each rope 180. A separate head termination device may also be provided in the hub device 192, and the sea water may be used to couple the head and tail termination devices.

In some embodiments, one or both of the termination devices 185 and the hub devices 192 may be omitted. For example, the representative rope segment 183 is shown without a connection to an associated hub device 192, and without a tail termination device 185.

Referring again to FIG. 1D, a source boat or vessel 175 can be configured to tow a seismic source 176 while conducting a seismic survey in the region of seismic nodes 150. In some embodiments, the seismic source 176 may be an air gun array (or a number of individual air guns) configured to release a blast of compressed air into the water column 174, emitting acoustic energy towards the seabed 171. As shown in FIG. 1D, the blast of compressed air generates seismic waves 177 which travel down through the water column 174 to the seabed 171, and which can penetrate the seabed 171 to reflect from subsurface or sub-seabed structures. The reflections from the subsurface structures can be recorded as seismic data by the nodes 150, and may thereafter be processed to develop an image of the relevant subsurface layers and other structures. These images can be analyzed by geologists to identify areas likely to include hydrocarbons and other resources, and to identify other geophysical features of interest.

In some embodiments, a plurality of source boats or seismic vessels 175 may be simultaneously operated while acquiring seismic data with nodes 150. In embodiments where multiple vessels 175 are used, the source boats may be configured to operate their respective seismic source or sources 176 according to a simultaneous source regime. For example, the sources 176 of two or more source boats 175 may be configured to emit seismic energy substantially simultaneously, or with a predefined delay such that there is at least some overlap in the duration of emission of seismic energy from two or more sources 176.

In some embodiments, a high precision clock may be included in each receiver or seismic node 150, or in selected receivers or seismic nodes 150. In alternative embodiments, a high precision clock signal may be provided via an external master clock configured to coordinate with slave timing devices implemented in the seismic nodes 150. The master clock may be located on a hub device 192, or in devices 188 placed at predefined intervals along one or more individual ropes or cables 180.

In some embodiments, the devices 188 may include a high precision clock and an interface or other communications components. In alternative embodiments, the devices 188 may also include other components such as a power source. In yet other embodiments, one or more such devices 188 can be configured as a "superstation" or similar seismic node, e.g., a seismic sensor device with all the components of a seismic node 150, as well as a high precision clock used to provide a master clock signal to other nearby seismic nodes 150.

Figure 2:
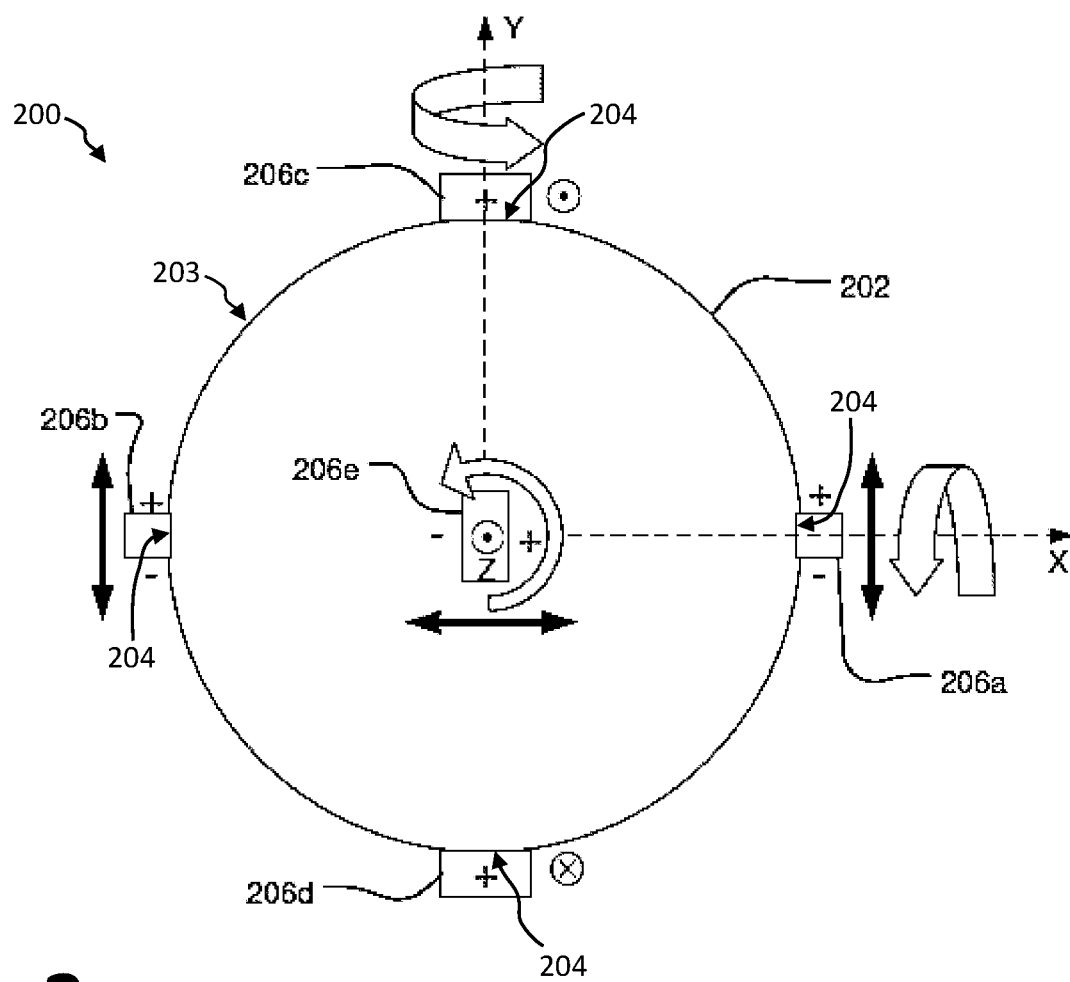
FIG. 2 is a schematic illustration of an exemplary sensor configuration for a multi-axis, single mass seismic sensor.

FIG. 2 is a schematic illustration of an exemplary sensor configuration for a multi-axis, single mass seismic sensor apparatus 200. As shown in FIG. 2, such examples can employ a sensor design corresponding to the single mass accelerometer sensor 100 of FIGS. 1A and 1B.

A number of sets of piezoelectric transducers or acceleration sensor elements 206a, 206b; 206c, 206d; and 206e, 206f can be mounted (e.g., using a conductive adhesive) onto a spherical central test mass or body 202 (e.g., made of brass or other metal, or with a conductive coating), which acts as a common ground for the transducers 206a-206f.

In one such configuration, the mass 202 may have a diameter of at least about seven times the maximum length of the crystal component of the transducers (i.e., 7×3.5 mm or 25 mm). In some particular embodiments, shear-mode piezoelectric transducers 206a-206f can be used, for example, oblong rectangular or similarly-shaped crystal transducers 206a-206f with dimensions of about 3.5 mm×2 mm×1 mm. More generally, the shape and dimensions of the transducers 206a-206f can vary, either individually or as a set, depending on application.

The test mass 202 can have parallel planar coupling surfaces 204 disposed at opposite ends of the orthogonal axes X, Y, Z, and further formed with shallow recesses or pockets sized to receive the transducers 206a-206f to help ensure that the transducers will stay in position, in addition to using an adhesive or other mechanical attachment. A first set of the piezoelectric crystal transducers 206a, 206b jointly create a linear accelerometer along the Y-axis oriented from side to side in FIG. 2, on opposing sides of the mass 202 along the horizontal X-axis, and a rotational accelerometer with sensitivity to rotation about the Z-axis. The long axis or longitudinal dimension of the crystal elements forming the transducers 206a, 206b may be oriented in and out of the plane of the figure, e.g., in the X-Z plane as shown.

A second set or pair of two transducers 206c, 206d can be similarly mounted along the Y axis, with the long dimension or axis of the crystal elements forming the transducers 206c, 206d being rotated perpendicular to that of the first pair of transducers 206a, 206b, e.g., oriented in the X-Y plane as shown. A third set of transducers 206e, 206f (the pair 206f of transducer 206e is positioned behind mass 202) may be mounted on opposing ends of the Z-axis, with the long axes of the crystal elements forming the transducers 206e, 206f being rotated perpendicular to the orientation of the first and second pair of transducers 206a, 206b and 206c, 206d, e.g., oriented in the Y-Z plane as shown.

Thus, the orientation of each set or pair of transducers 206a, 206b; 206c, 206d; 206e, 206f can be orthogonal to that of the other sets, e.g., where the pairs of respective crystals are mounted with their longer dimension oriented in the X-Y, X-Z and Y-Z planes, respectively, as shown in the schematic view of FIG. 2. Note that the "+" and "-" symbols adjacent to (or overlaid on) each of the transducers 206a-206f in FIG. 2 are indicative of the shear alignment of the transducers 206, and are not necessarily indicative of the location or polarity of the electrodes connected to the transducers 206a-206f. More generally, the shear alignment and corresponding electrode polarity may vary, as described herein.

The external housing or frame of the sensor apparatus 200 (see, e.g., FIG. 1B) can be made of a suitably stiff non-conductive material (e.g., a ceramic), and configured to maintain the relative orientation and position of the central mass 202 by connecting each of the transducers 206a-206f to a corresponding side of the frame. The frame itself can be built in pieces and rigidly connected together around the mass 202. Alternatively, an opening could be provided within the frame or housing, sized to accommodate insertion of the mass 202 with the attached transducers 206a-206f in a first selected orientation (e.g., with the transducers oriented diagonally toward corners), and then rotated to a second selected orientation for connection of the mass 202 in a fixed position with respect to the frame (e.g., with the transducers adjacent the perpendicular frame members).

In any of these examples, a selected (e.g., negative) electrode of each of the transducers 206a-206f may be oriented toward and in electrical contact with the outer surface 203 of the adjacent mass 202, with the other (e.g., positive) electrode disposed on the opposing surface, accessible for contact by a wire lead or other electrical contact with the frame or housing. For example, the positive electrodes of the transducers 206a-206f can be connected to signal output ports via a wire (e.g., soldered or welded). Each frame member of the housing may also be electrically isolated from the other frame members, in order to prevent interference from the signals generated by the separate individual transducers 206a-206f.

Sensor Configurations

Figure 3:
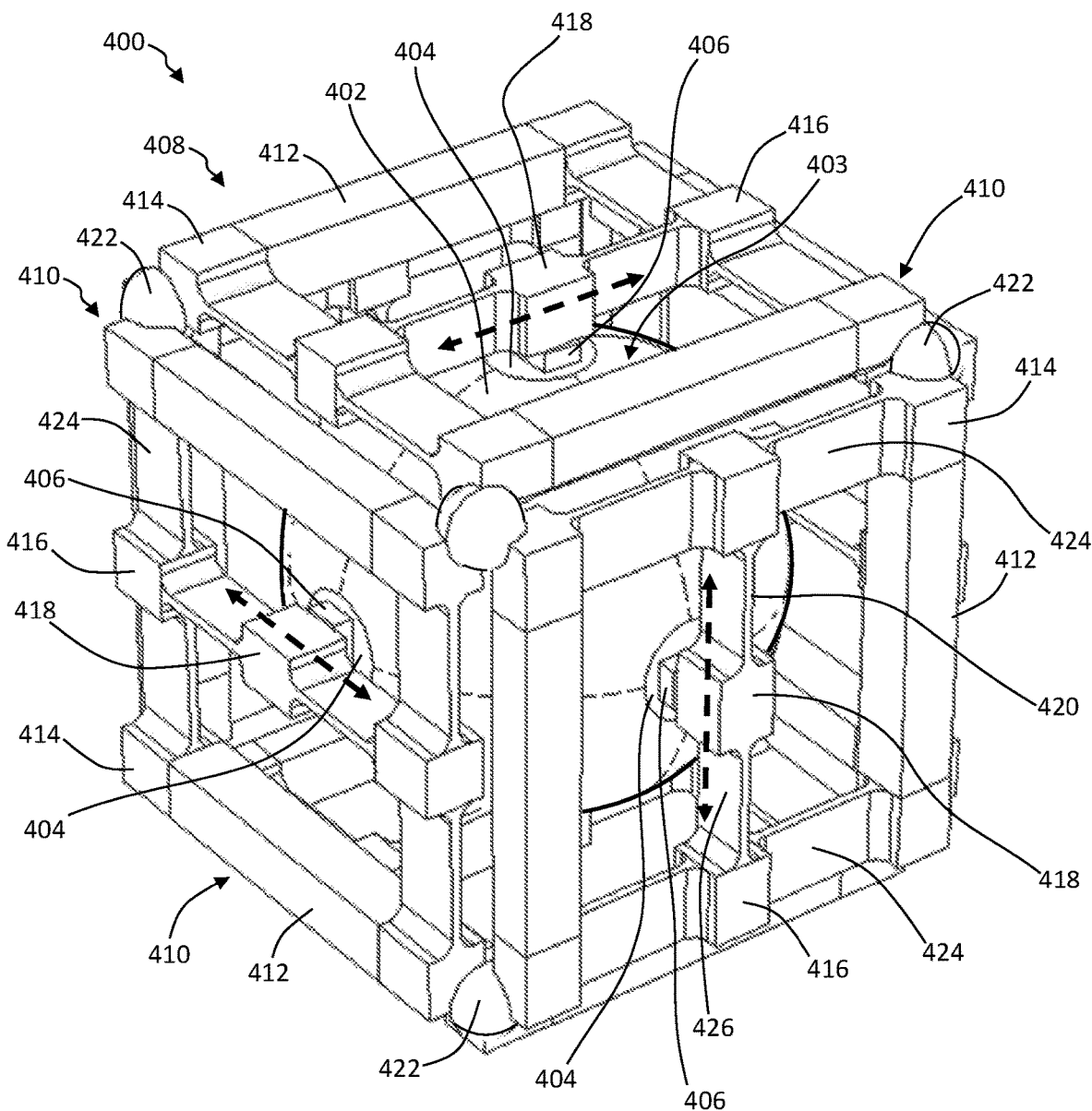
FIG. 3 is an isometric view of a representative multi-axis, single mass seismic sensor.

FIG. 3 is an isometric view of a representative multi-axis seismic sensor 400 with a single central mass 402. In this exemplary implementation, structural features are adapted to the dynamic range considerations noted above, as well as to provide increased electrical conductivity and specific isolation for each of the six independent transducer circuits. The test mass or body 402 in this embodiment is a conductive sphere with an outer surface 403 suitable for forming a physical bond of sufficient strength and suitable conductivity with each sensor element or transducer 406 (e.g., having an electric loss $\tan(\delta) \leq 0.004$). For example, the central mass 402 may be made of an anodized aluminum core material coated with a surface or outer layer 403 of gold or other conductor. The mass 402 can also be scaled based on the specific gravity of the aluminum or other core material. Planar coupling surfaces 404 may be formed on the surface 403 of the mass 402, and coupled to piezoelectric crystal transducers 406 aligned along three orthogonal axes having an origin at the center of the mass 402, as described above.

The surfaces 404 provide a bonding and alignment surface for attachment of each of the transducers 406. In some embodiments, a shallow rectangular or oblong recess can be formed in each of the surfaces 404, adapted to properly align the transducers 406 and aid in bonding the transducers 406 to the mass 402. The transducers 406 are typically formed as generally flat and elongate rectangular structures, and can be aligned such that the pairs of transducers 406 on opposing ends of each axis are aligned in parallel with one another, and with respect to the direction of shear sensitivity in the crystal. Each of the other two pairs of transducers 406 can be similarly aligned, such that the transducers 406 in each pair are generally parallel in shear sensitivity, but orthogonal to the transducer pair alignments for each of the other two axes.

In some exemplary implementations, the transducers 406 may comprise or be formed from a single crystal piezoelectric, for example a PMN-PT crystal or other suitable material, as descried herein. The transducers 406 may be adhered to the surfaces 404 with a conductive adhesive, such that the common (negative) contacts of the transducers 406 are each in electrical contact with the mass 402.

The mass 402 of the single mass accelerometer 400 can be enclosed by a housing or frame 408 with six side members or frame components 410 assembled in opposing pairs. Each pair of the sides 410 can be disposed along one of the principal axes of the central mass 402, each pair having an orthogonal or transverse orientation with respect to the others. Each side 410 of the frame 408 may further be comprised of two lateral pillar or beam members 412 arranged in parallel with respect to one other, and together forming substantially half of the perimeter of each side 410. The lateral members 412 may be substantially uniform in width and depth (e.g., generally square in cross-section, taken transverse to the length or longitudinal direction), and provide a substantially rigid structure in three dimensions.

The ends of the lateral pillar or beam members 412 can be connected by a pair of cross beams 414, forming the remaining perimeter of each side 410. The cross beams 414 may be formed with flat web sections 424 extending from each of the lateral members 412, and joined together in the center of the span by a center support or coupling member 416. The flat webs 424 may lie within the plane of each side 410 of the frame 408, and the support member 416 may be formed substantially as a cube or right rectangular prism, e.g., with length, height and width similar to the transverse width of the flat web sections 424 of the lateral member 412.

A central sensor beam 420 can extend between the support members 416 of the cross beams 414, oriented generally parallel to and between the lateral members 412, in order to complete each side frame member 410. Each sensor beam 420 can be formed with two flat, transverse web sections 426 joined together in the center of the span, e.g., by a sensor support post or bracket 418. The flat web sections 426 of each sensor beam 420 can be oriented perpendicular to the plane of the corresponding side 410, and perpendicular to the flat web sections 424 on the cross beams 414. The sensor support 418 can be formed substantially as a cube or right rectangular prism, e.g., with length, height and width similar to the transverse width dimension of the flat web sections 426 of the sensor beam 420.

As shown in FIG. 3, the individual sides 410 of the frame 408 may be generally flat or planar, and can be built to high structural tolerance and repeatability. In an illustrative embodiment, the sides 410 of the frame 408 may be formed from machinable ceramics to maximize orthogonal tolerances and stiffness in the side frames 410. In other embodiments, the side frames 410 may be made of aluminum or other conductive metal material, or of a composite material. Thus, the side members 410 of the frame 408 may be either conductive or insulating.

The six individual side frame members 410 can be affixed together to create a rigid cube-shaped housing or frame 408, which is disposed around the test mass or central body 402. It may be desirable to connect the sides 410 of the frame 408 together using isolation members 422 to reduce the mechanical coupling between the adjacent lateral members 412 and cross beam members 414 in each individual frame component 410, e.g., with isolation members 422 disposed at the corner intersections of the side frames 410. The isolators 422 (eight total) may operate to minimize the transfer of mechanical and vibrational energy from one side 410 of the frame 408 to another as the mass 402 moves relative to frame 408, e.g., in response to seismic energy as described herein.

In embodiments in which the frame components 410 are made from a conductive material (e.g., aluminum or other metal), the isolators 422 may further be electrical insulators. In one exemplary embodiment, each end of the lateral components 412 may also be formed with a concave recess to accept a substantially spherical isolator 422 as shown; however, other shapes and forms of isolators 422 may be used. In some implementations, the isolators may be formed of glass, ceramic, or G10 glass fiber/epoxy. The lateral members 412 and isolators 422 may be fixed to each other using an epoxy or other form of adhesive.

The outer surfaces of each of the transducers 406 may be affixed to an inner surface of a sensor support 418 on the corresponding side frame component 410, for example with an adhesive. As the rigid sensor beam 420 is connected across the center portion of each side 410, the resonant frequency can be relatively high.

The ability to minimize cross-axis influences on the pairs of parallel transducers 406 in the sensor system 400 may be affected by the accuracy of orthogonal alignment of the relevant crystal axes of the transducers 406, and the accuracy of the polarization of the crystals. For greater economy, sensitivity and reliability, each side 410 of frame 408 may incorporate a sensor beam 420 connected across the side component 410, which includes one or more web sections 426 designed to be relatively stiff along the sensing axis and relatively softer or less stiff along the non-sensing axis. This construction is similar in effect to that of the cross beam members 414, which have a flat web section 424 corresponding to the flat web sections 426 of the sensor beams 420. This configuration can increase or maximize the sensitivity of the attached transducers 406 in the sensing axis (e.g., for an axially parallel transducer pair). Further, in this embodiment, the cross beams 414 in each side 410 of the frame 408 are configured to reduce the effects of forces along the orthogonal axes operating on the respective side frame components 410 of the frame 408.

An advantage of this design is the generation of relatively high mechanical shear stress on the transducers 406 in the principal or primary sensing direction, e.g., along the longitudinal dimension of the corresponding sensor beam 420, indicated by the bold, dashed arrows in each side 410 of the frame 408. Conversely, there may be relatively lower shear stress in the cross-axis directions; e.g., reduced by about −40 dB relative to the primary sensing direction.

Embodiments of the sensor assembly 400 can accomplish these results by configuring the sensor beams 420 to be relatively stiffer in the sensing direction; that is, longitudinally along the plane of the transverse web sections 426, as shown by the arrows in FIG. 3, and relatively less stiff (more flexible or "softer") in the cross-axis direction, normal to the plane of the transverse web sections 426. Similarly, the cross beams 414 in each side 410 of frame 408 may likewise be configured for relatively higher stiffness in the sensing direction (transversely along the plane of the flat web sections 424), and for relatively less stiffness and more flexibility in the cross-axis direction, normal to the plane of the flat web sections 424.

Since the sensor beam 420 and cross beam members 414 on each side section 410 of the frame 408 can be relatively stiffer in the sensing direction than in the cross-axis directions, shear stress on the crystal element of the corresponding transducer 406 can be enhanced or maximized along the primary sensing axes. At the same time, "crosstalk" from the principal sensor axis to the other independent axes can be reduced. The construction of sensor 400 thus increases sensitivity by augmenting the effects of the crystal orientation properties of the individual transducers 406; in order to produce relatively more voltage when stressed in their preferred sensing direction, and to reduce off-axis effects in order to achieve a desired level of vector fidelity.

More specifically, sensor 400 is configured to generate a consistent representation of the motion or impulse along each independent measurement axis, regardless of sensor orientation. Sensor 400 is also configured to substantially reduce the response to an impulse along one particular sensor axis, as observed by the other two independent (orthogonal) axes. This improves the vector fidelity by providing a more accurate representation of the actual (physical) vector wavefield observed at sensor 400, while reducing non-physical sensor response effects.

Depending on application, a sensor according to the design in FIG. 3 can be configured with sensitivity and dynamic range selected for an OBN maximum signal (direct arrival) acceleration value of about ±335 mg's and OBN minimum signal of about 20 ng$^2$/Hz (at about 2 Hz to about 200 Hz). Suitable transducer configurations include, but are not limited to, PMN-PT shear mode crystals and piezoelectric accelerometer sensor (PAS) elements, e.g., with a $d_{15}$ piezoelectric dielectric coefficient on the order of about 4,500 pC/N/g.

In particular examples, suitable rectilinear PAS crystal dimensions may be on the order of about 3.5 mm×2 mm×1 mm. Suitable mechanical parameters can include, but are not limited to, an average shear stress based on double shear area of approximately 16 MPa (2,500 psi), using an average tensile value of 50 pounds force (about 220 N). A suitable mass body may be provided in the form of an aluminum sphere, as described above, for example with a diameter on the order of about 2.35 cm (0.925 in) and a mass on the order of about 18.3 g. Suitable frame or side panel components may be provided in the form of 3.124 cm (1.23 in) thick (square) aluminum brackets or pillar components, with aluminum cross-beam and sensor beam members having 0.508 mm (20 mil) thick web sections. These values are merely representative, and vary from embodiment to embodiment.

In particular examples, glass spheres and other suitable materials may be used for the isolators 422. From a durability perspective, such constructions may be able to withstand an impact on a hard surface from a 30.5 cm (12 in) drop, resulting in upward acceleration of approximately 784 g's over a ½-period sine wave impulse with a pulse width of ½ millisecond. This contrasts with prior art designs, which may typically be subject to damage from substantially lower applied shocks.

Suitable testing procedures include moving the sensor apparatus 400 vertically at an acceleration of 300 mg's along the Z-axis (or along any other selected axis), at a discrete distribution of frequencies. For such tests, the corresponding acceleration boundary conditions can be enforced or defined on the isolators 422, or otherwise located at the corners of the sensor apparatus 400 as shown in FIG. 3. The resulting stress on the transducer crystals 422 induced by this motion is plotted in FIG. 4.

Figure 4:
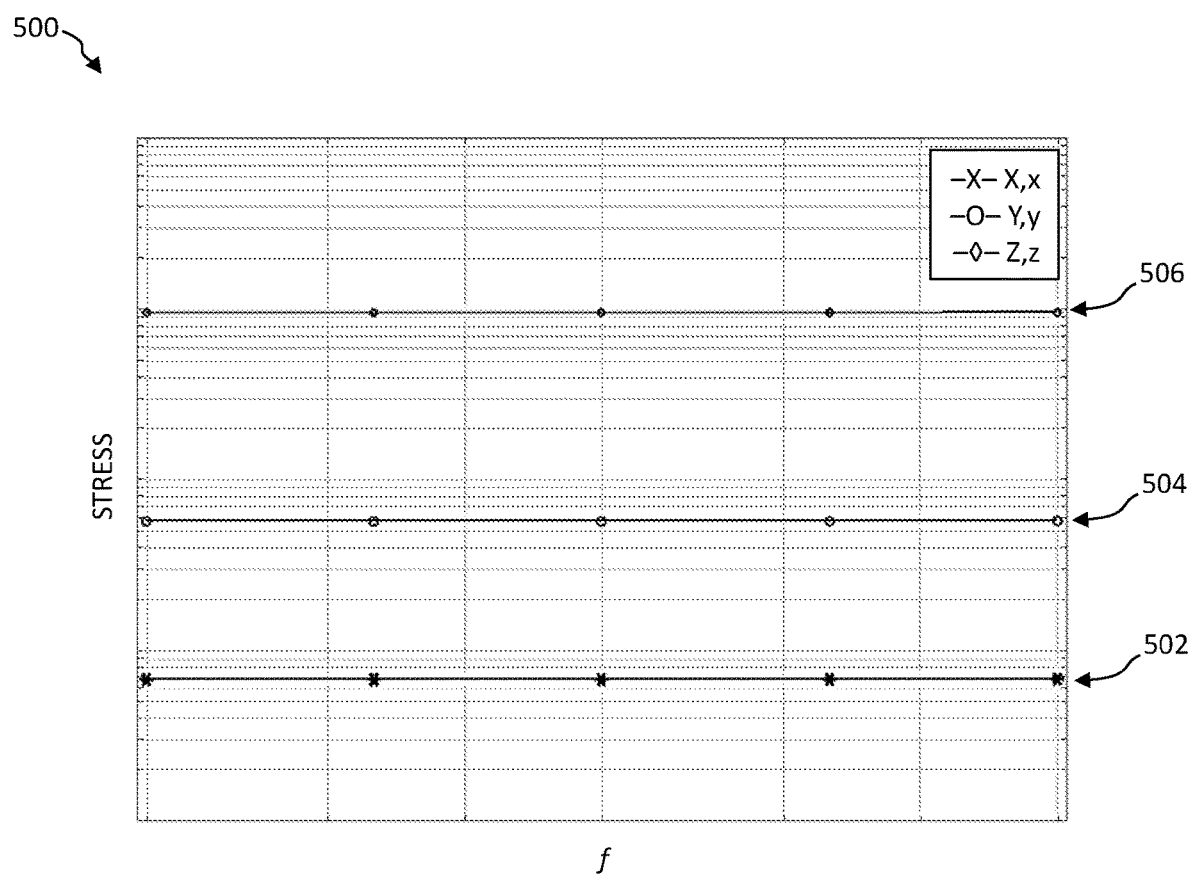
FIG. 4 is a shear stress plot for the representative seismic sensor design, as a function of frequency.

FIG. 4 is a shear stress plot 500 for the representative seismic sensor design 400 of FIG. 3, as a function of frequency. Depicted are the relevant shear stresses on the crystals, for the three primary X, Y and Z sensor axes (lines 502, 504 and 506, respectively).

For the crystal pair designated as the Y-axis accelerometer, for example, $T_{xy}$ is plotted (line 504), since this is the shear stress that produces non-negligible voltage and can be oriented so as to correspond to Y-axis accelerations. Shear stress on the X-axis transducer (line 502) and Z-axis transducer (line 506) are also plotted for each frequency. The datum point at each frequency is the maximum stress on either of the corresponding crystal faces in contact with the central mass. There are two crystals per axis, and one contact face per crystal (that is, where the transducer is attached to the outer surface of the mass).

Two features are indicated by shear stress plot 500. The first is that the crystal responses are substantially flat with respect to frequency. This occurs because the sensor resonance is significantly out of the frequency band. The second is that the Y-axis response may be relatively strong; e.g., only about 23 dB below that of the Z axis. Note also that for accelerations in the direction of the Z-axis (Z-axis shake), the Y axis is the axis for which the single sensor beam in contact with the transducer crystal is the softest or least stiff connection, potentially resulting in greater stress on the Y-axis crystals. In contrast, the pair of cross beams on the Y-axis frame may be relatively more rigid in response to motion along the Z axis. The response of this design can improve when the beam thickness is reduced to about 0.254 mm (0.01 in), but thicker designs may also be favored, e.g., based on manufacturing considerations.

Consistent with the transducer crystal shear stress being substantially constant as a function of frequency, and with the transducer crystals acting as springs between the mass and the frames, the relative displacement between the mass and the isolators (considered control or boundary conditions for the applied acceleration) is also substantially constant with frequency. In particular examples, the corresponding relative displacement amplitude is about 7.33 nm. The overall relative displacement with respect to the isolators (or other references) can be found according to $A/(2\pi f)^2$, where f is the frequency and A is the acceleration (e.g., 300 mg's).

Figure 5:
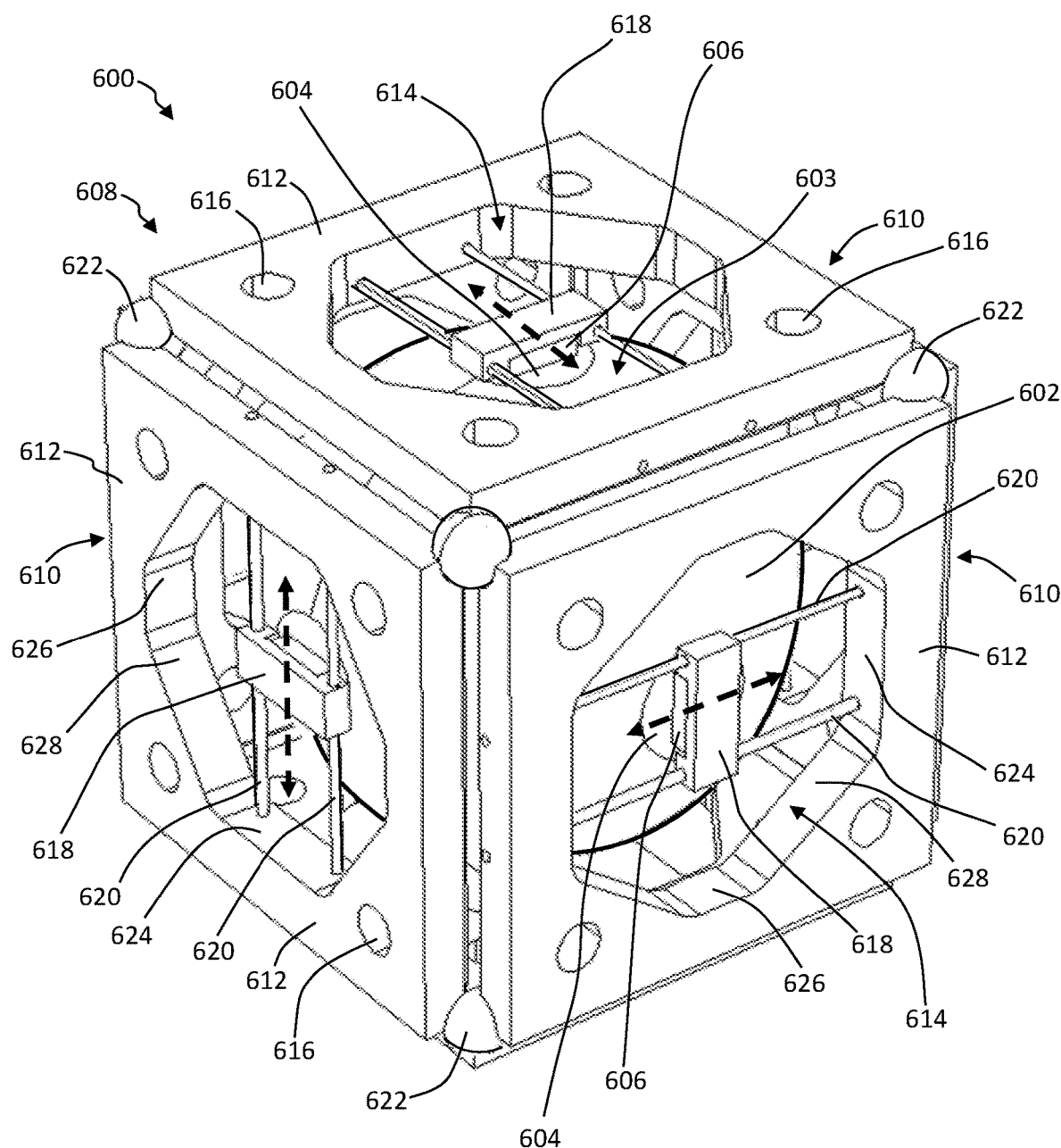
FIG. 5 is an isometric view of an alternate multi-axis, single mass seismic sensor design.

FIG. 5 is an isometric view of an alternate multi-axis, single mass seismic accelerometer sensor apparatus 600. The sensor 600 may be configured somewhat differently from the embodiment of FIG. 3, and provide additional structural and manufacturing advantages. In other respects the accelerometer 600 of FIG. 5 may be similar to that of FIG. 3.

As depicted in FIG. 5, the sensor 600 is constructed with a central test mass or body 602 enclosed within a housing or frame 608. The central mass 602 may be spherical (either solid or hollow), or configured according to other embodiments. Six planar or recessed surfaces 604 can be formed on the outer surface 603 of the mass 602, e.g., aligned with the opposing ends of the three orthogonal axes having an origin at the center of the mass 602.

The surfaces 604 provide bonding and alignment structures for attachment of each sensor element or transducer 606. In some embodiments, a shallow rectangular pocket or recess may be formed in each of the surfaces 604, in order to suitably align the transducers 606 and aid in bonding the transducers 606 to the outer surface 603 of the mass 602.

The frame 608 may be formed by the connection of six flat plate sections or side plate members 612 configured to form a generally cubical enclosure about the mass 602. For example, each of the plates 612 may form a side frame component or section 610 of similar or substantially identical size, thickness, and construction. The individual plates 612 may be machined from aluminum or ceramic, or formed from other materials with suitable durability and rigidity.

A central aperture 614 may be formed in each of the plates 612, e.g., substantially centrally located in each side 610 of the frame 608. A number of bore holes 616 may also be formed within the plates 612, e.g. in the corners of the frame section 610, spaced apart from the central aperture 614 as shown in FIG. 5. The individual frame sections 610 can be connected at the corners by isolators 622, in order to provide electrical isolation and reduce force coupling between the adjacent frame sections 610 as in the embodiment of FIG. 3.

In the exemplary embodiment of the sensor apparatus 600 depicted in FIG. 5, the central aperture 614 may be octagonal in shape and bounded by sets of parallel and opposing interior walls 624, 626 and 628, e.g., with walls 624 substantially normal to walls 626 and walls 628 diagonally disposed between walls 624 and 626, each of which may have approximately the same or different lengths. Alternatively, the aperture 614 may have a circular, triangular, oblong, square, hexagonal or other geometry, and the interior wall configuration may vary accordingly.

In contrast to the sensor beam configuration shown in the embodiment of FIG. 3, one, two or more rod elements 620 may be used to connect each of the transducers 606 to the side frame section 610. Each transducer 606 may be held within a bracket or support structure 618, which is supported within the central aperture 614 by the rods 620.

Rod elements 620 are fixed to and extend between the opposing interior walls 624 of central aperture 614. The rods 620 may be disposed generally parallel and spaced apart from one another, extending through the lateral ends of the sensor support 618. In exemplary implementations, the rods 620 are made of beryllium copper, e.g., having a circular cross section of about 0.508 mm (0.02 in) in diameter. Beryllium copper and other suitable materials provide rod elements 620 with high yield strength and conductivity, and the circular cross-section results in substantially similar shear stress response in both cross-axis directions, perpendicular to the primary translational shear axis oriented along the longitudinal direction (indicated by the dashed double arrows). Alternatively the materials and cross-sectional geometry may vary, depending on application.

In illustrative embodiments, the brackets or supports 618 may be made of brass or other suitable metal material, and designed to clamp to the rods 620 on the longitudinal sides of the piezoelectric crystal transducers 606. The frame 608 may be sized with the rods 620 positioned close to the inner faces of each of the frame section 610, so as to reduce "peeling" moments. For example, shear force on a crystal transducer 606 transverse to the primary translational shear axis (dashed double arrows) may create a stress component that can act to peel off or otherwise dislodge the transducer 606 from the mass 602, and generate sufficient force to break the glue bonding or other mechanical coupling that holds the transducer 606 to the outer surface 603 of the mass 602. Generally, the closer the rods 620 are to the mass 602, the smaller the corresponding moment, reducing this potential effect.

In a similar operation as discussed above with respect to FIG. 4, the sensor apparatus 600 of FIG. 5 can be moved vertically (e.g., along the Z-axis) with an acceleration of about 300 mg's, at a discrete distribution of frequencies. For such testing, the corresponding vertical acceleration boundary condition can be enforced on the isolators 622, for which the value and phase of the acceleration is defined. The stress on the transducer crystals 620 induced by this motion is plotted in FIG. 6.

Figure 6:
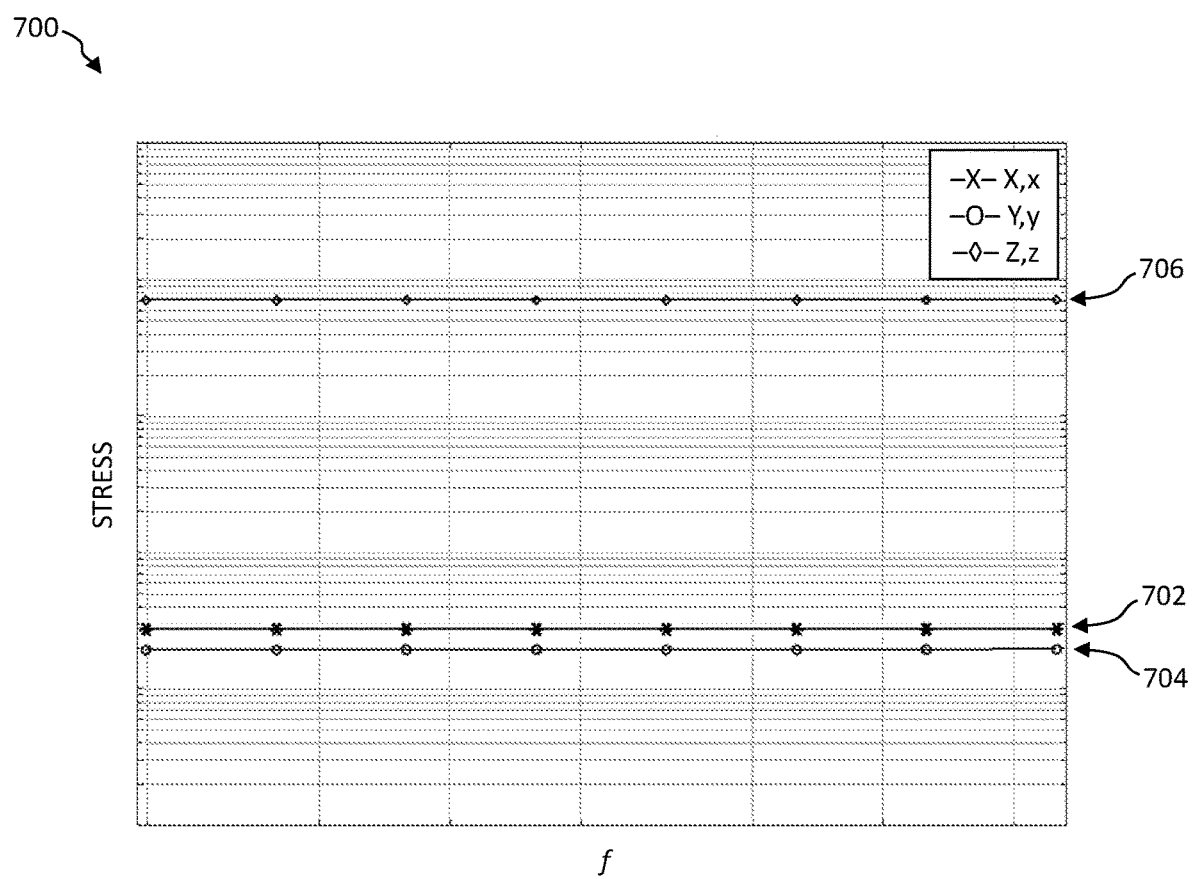
FIG. 6 is a shear stress plot for the alternate seismic sensor design.

FIG. 6 is a shear stress plot 700 for the alternate seismic sensor 600 of FIG. 5, as a function of frequency. Depicted are the relevant shear stresses on the crystals, for the three primary X, Y and Z sensor axes (lines 702, 704 and 706, respectively).

For the crystal pair designated as the Y-axis accelerometer, $T_{xy}$ is plotted (line 704), since this is the shear stress that produces non-negligible voltage and can be oriented so as to correspond to Y-axis accelerations. Corresponding shear stresses on the X-axis transducers (line 702) and Z-axis transducers (line 706) are also plotted, for each frequency. The datum point at each frequency is the maximum stress on either of the crystal faces in contact with the central mass. Again, there are two crystals per axis, and one contact face per crystal, where the transducer is attached to the outer surface of the mass.

The crystal responses remain substantially flat with respect to frequency, due to the sensor resonance being significantly out of band. In contrast to the embodiment of FIG. 4, however, the cross-axis responses (for the X-axis and Y-axis transducer pairs) are more similar, and both are more than 40 dB below that of the driven axis (for the Z-axis transducer pair). The vector fidelity requirements are further satisfied by this design, where the response to an impetus along a particular axis is consistently and accurately measured, and the off-axis response is substantially smaller than the on-axis response.

Consistent with the transducer crystal shear stress being substantially constant as a function of frequency, and with the transducer crystals acting as springs or similar biased couplings between the mass and the frames, the relative displacement between the mass and the top frame (considered the control) is also substantially constant with frequency. In these particular examples, the relative displacement amplitude is about 0.91 nm. The overall relative displacement of the sensors can be found according to $A/(2\pi f)^2$, where f is the frequency and A is the acceleration (e.g., 300 mg's).

Figure 7:
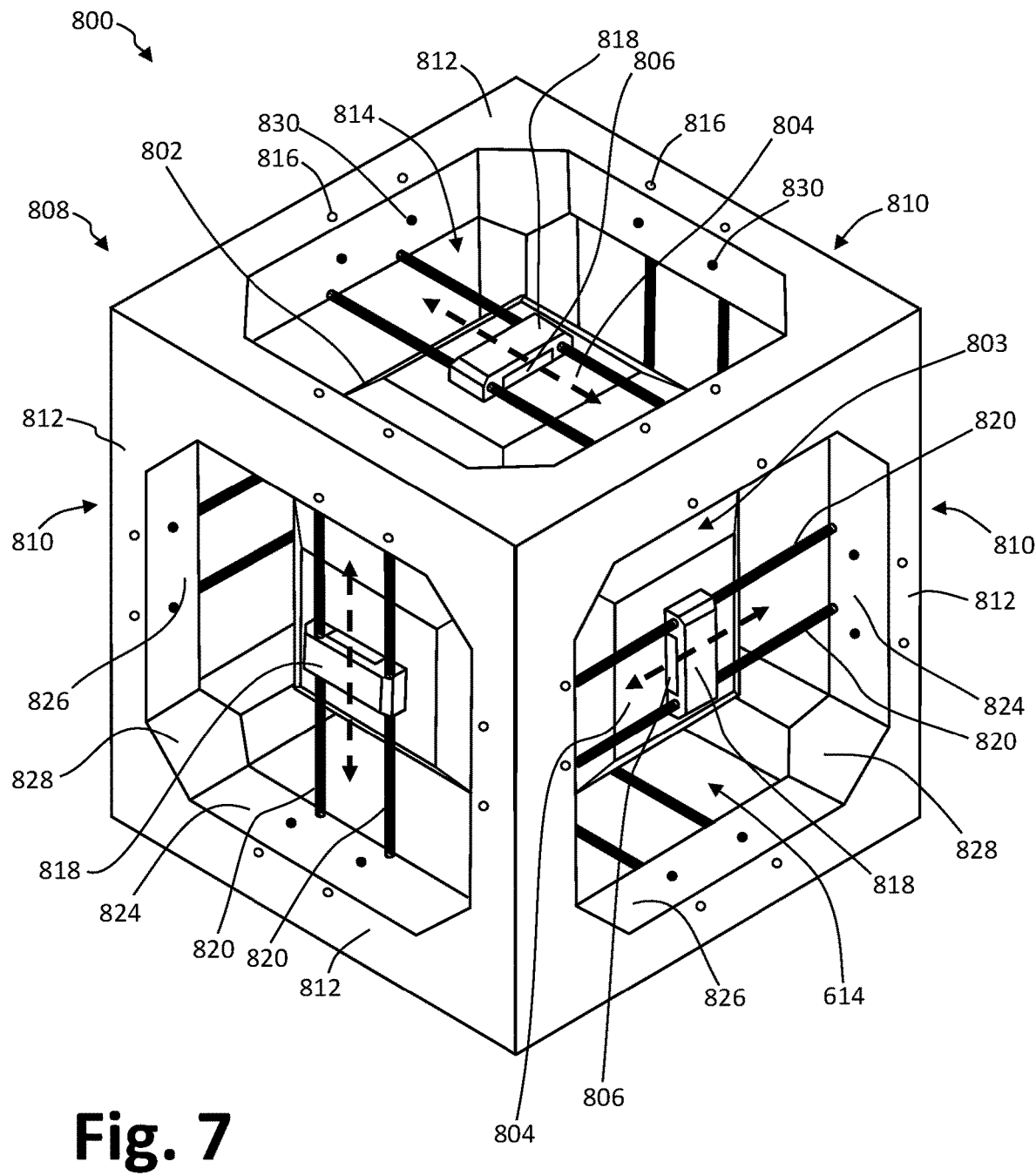
FIG. 7 is an isometric view of a further alternate multi-axis, single mass seismic sensor design.

FIG. 7 is an isometric view of a further alternate multi-axis, single mass seismic sensor apparatus 800. As depicted in FIG. 7, the sensor apparatus or accelerometer 800 may be similar in some respects to the sensor 400 of FIG. 3 and the sensor 600 of FIG. 5. The housing or frame 808 of sensor apparatus 800 can also be fabricated from single piece of machinable ceramic, metal or other suitable material, providing additional orthogonality and stiffness.

The central test mass or body 802 is enclosed within the housing or frame 808. The central mass 802 may be spherical (either solid or hollow), or formed as symmetrical polyhedron or other shape (e.g., with six planar coupling surfaces 804 formed on the outer surface 803 of the mass 802, aligned with opposing ends of three orthogonal axes having an origin at the center of the mass 802). The coupling surfaces 804 provide a bonding and alignment surface for attachment of the sensor elements or transducers 806, as described above. In some embodiments, a shallow pocket or recess may be formed in each of the surfaces 804, in order to accommodate and align individual piezoelectric crystal transducers 806, and to aid in bonding the transducers 806 to the outer surface 803 of the mass 802.

As shown in FIG. 7, the frame 808 may include six flat faces or sides 810 forming a cube around the mass 802. Such a frame 808 can be formed as a monocoque or similar structural shell component, machined from a ceramic (e.g., a MACOR material), or from a suitable metal or other material with suitable rigidity and other mechanical properties.

A central aperture 814 can be formed in each of the side faces 810 of the frame 808, surrounded by a plurality of lateral pillar or beam members 812 providing a perimeter framework for a cubic frame 808. In symmetric embodiments, the lateral members 812 may be similarly constructed, or substantially identical in size, thickness, and construction.

As depicted in FIG. 7, the central apertures 814 can be generally square or octagonal in shape, and bounded by two pairs of parallel and generally opposing interior walls 824 and 826. Walls 824 and 826 may be of similar length, with alternating pairs of walls 824 and 826 oriented generally perpendicular to one another. The remaining interior walls 828 may be generally shorter than and oriented diagonally with respect to other interior walls 824, 826, and with respect to the lateral perimeter components 812 along the sides 810 of the frame 808. The diagonal walls 828 may further slope inward toward the mass 802, and may seamlessly transition into the lateral members 812 which extend along each side 810 of the frame 808. The central apertures 814 may also be large enough to accommodate the mass 802 for insertion and securing within the frame 808.

As in the embodiment of FIG. 5, a pair of cylindrical rods 820 can be used to connect each of the transducers 806 to the frame 808 of the sensor apparatus 800, as shown in FIG. 7. In particular configurations, each transducer 806 may be held within a bracket or support 818 that is further held within the central aperture 814 by the rods 820, which are fixed to and extend between a pair of opposing interior walls 824. In an exemplary configuration, the ends of the rods 820 may be inserted into holes 816 bored into the lateral pillar or beam components 812 of the side faces 810, and fixed therein, e.g., with an adhesive. The pairs of rods 820 can be disposed parallel to and spaced apart from one other, extending through lateral ends of the corresponding bracket 818. In exemplary implementations, the rods 820 can be made of beryllium copper having a circular cross section of about 0.508 mm (0.02 in) in diameter. Alternatively, the dimensions and material composition vary.

In illustrative embodiments, the supports 818 may be made of brass or other suitable metal material and designed to clamp to the rods 820 onto the sides of piezoelectric crystal transducers 806. The frame 808 may be sized accordingly, and the rods 820 may be positioned close to the inner surface of each side 810 of the frame 808 so as to reduce "peeling" moments, as described above. In addition, channels 830 may be drilled or otherwise formed in the lateral components 812, e.g., from an inner edge of the pillar members, transverse to and in fluid communication with the bore holes 816 that receive the rods 820, in order to inject adhesive (e.g., a conductive epoxy or other bonding agent) to hold the rods 820 in place.

Figure 8A:
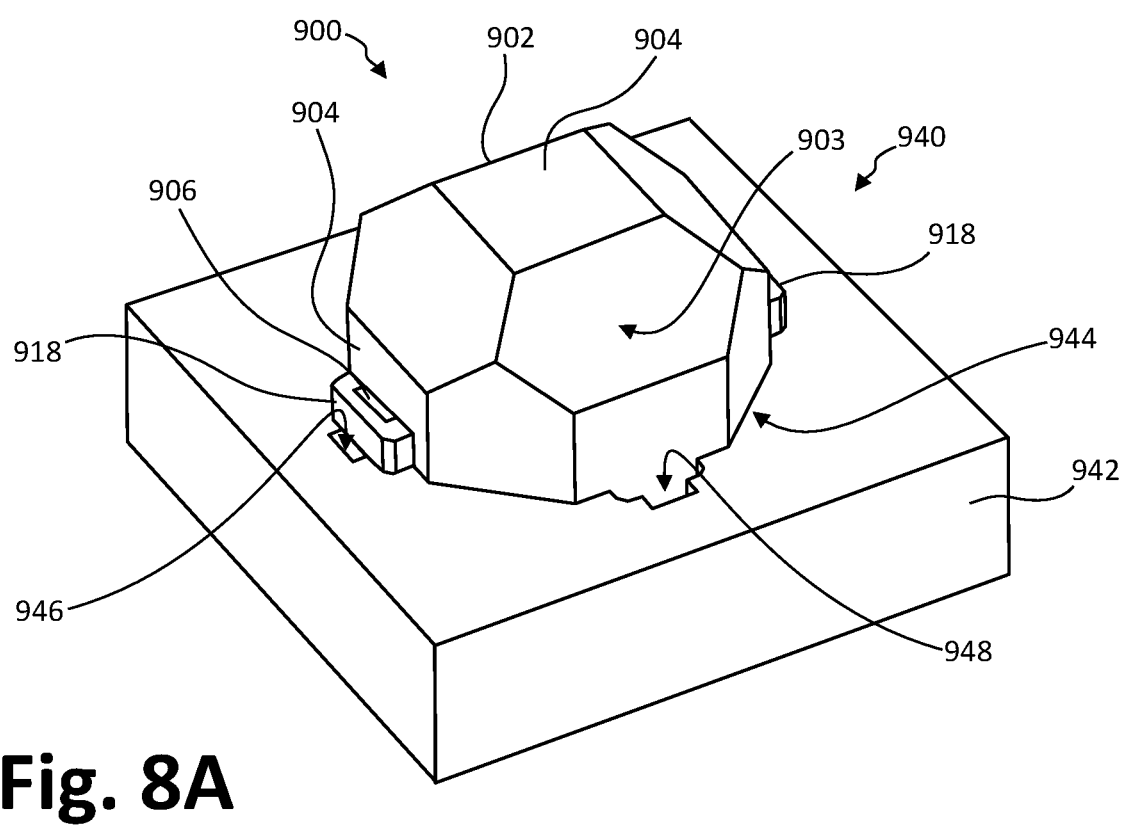
FIG. 8A is an isometric view of an alignment tool or jig for assembling the sensor components of a multi-axis, single mass seismic sensor.

FIG. 8A is an isometric view of an alignment tool or jig 940 for manufacturing a single mass seismic sensor 900 with a central test mass or body 902. FIG. 8A depicts the tool or jig 940 adapted for aligning the sensor elements or transducers 906 and support brackets 918 with respect to the central mass 902.

The mass 902 can be inserted into a main port 944 defined in the base 942 of the alignment tool 940, sized and configured to receive the mass 902 in the particular shape or form in which the mass 902 is machined or otherwise made, and to hold the mass 902 in a particular orientation. A number of slots 946, 948, etc. may be formed in the base 942 adjacent the main port 944, and aligned with the transverse axes of the mass 902, adjacent the corresponding attachment surfaces 904. The slots 946, 948 may be sized and configured to receive a combination of a transducer 906 and a corresponding bracket or support 918 in a suitable orientation to align the crystals of the transducers 906 along the desired shear axis.

The transducers crystals 906 may thus be affixed to the mass 902 in a desired alignment, and held in place for an extended period while the applied adhesive cures. Multiple piezoelectric transducers or other sensor elements 906 can thus be bonded to the mass 902 in concurrent operations.

Figure 8B:
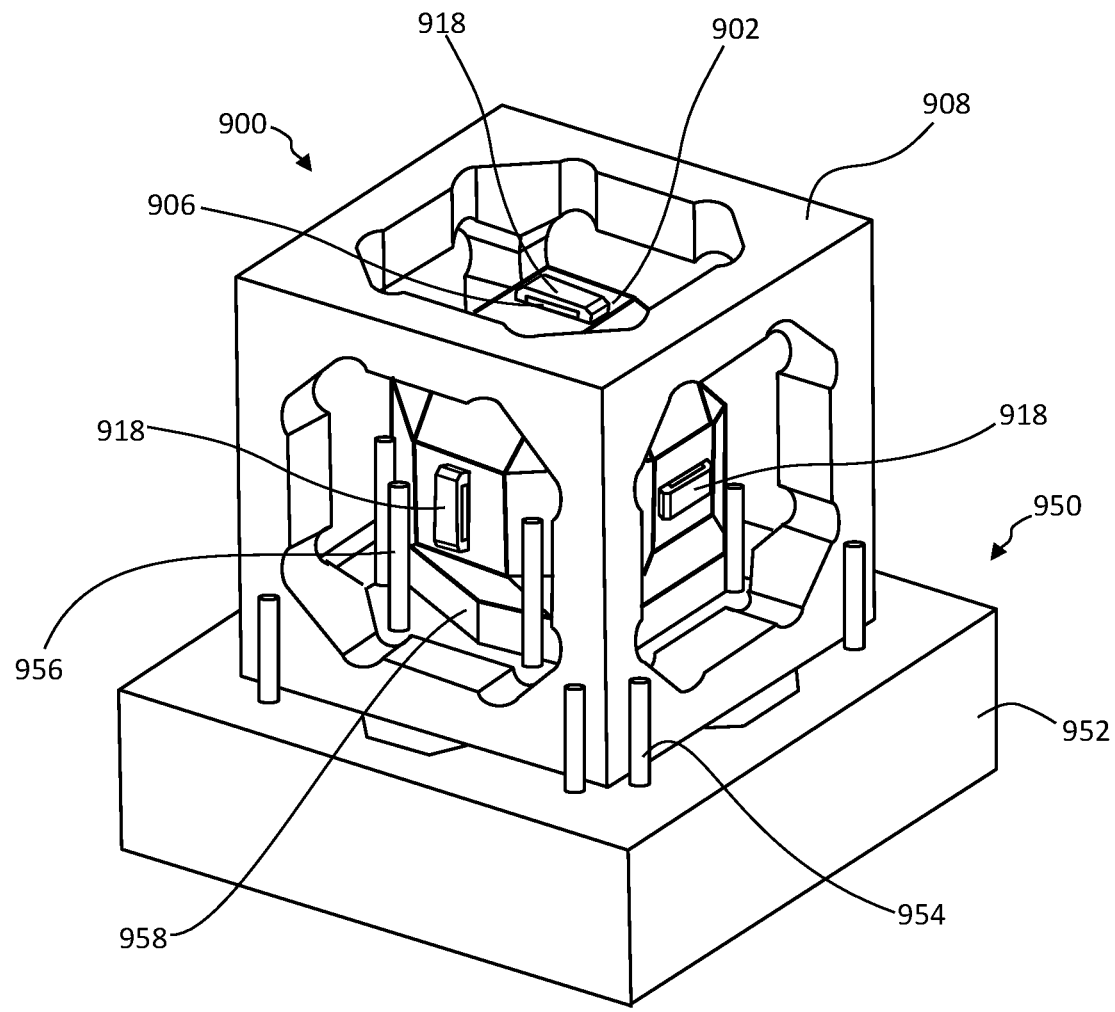
FIG. 8B is an isometric view of an alignment tool or jig for assembling a multi-axis, single mass seismic sensor.

FIG. 8B is an isometric view of an assembly jig 950 for a multi-axis, single mass accelerometer or seismic sensor apparatus 900. A second step in the manufacturing process may be aided by the assembly jig or tool 950 depicted in FIG. 8B.

The mass 902 with the transducers 906 and supports 918 previously bonded thereto may be temporarily held in place on a base 952 of the tool 950. A number of vertical posts 954 can be removably placed within holes in the base 952 of the assembly tool 950 to hold the mass 902 in place. A center portion 958 of the base 952 may be stepped suitably in order to raise the mass 902 above the surface and to position the mass 902 within the housing or frame 908 when placed over the mass 902, resting on the base 952.

The frame 908 may further be held in place by a set of additional vertical posts 956 that can be removably placed within additional holes in the base 952 in order to hold the frame 908 in place with respect to the mass 902. While the mass 902 and the frame 908 are held in place with respect to each other on the assembly tool 950, the rods may be inserted through bores in the pillars of the frame 908 from a first side, through apertures in the supports 918, and then through bores on opposing pillars defining a face of the frame 908, as shown, e.g., in FIG. 5 and FIG. 7. Adhesive may then be injected through the adhesive channels and cured to secure the rods to the frame 908 and the supports 918. The assembly tool 950 thereby provides for a simultaneous, all-axis curing operation for the bonding of the rods, thereby minimizing and normalizing any stress that might otherwise be placed on the rods and the transducers during the assembly process.

Sensor Response

Figure 9:
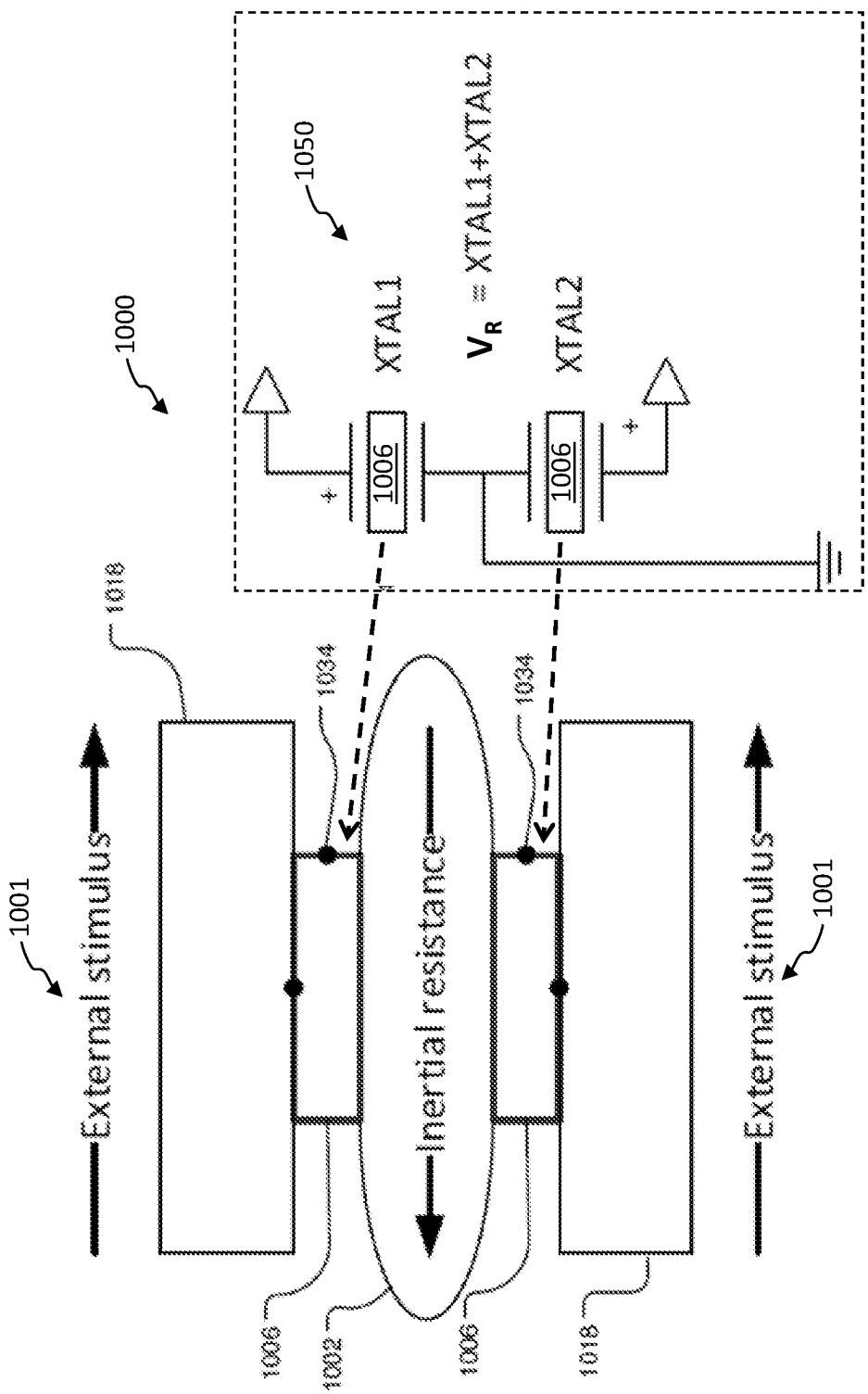
FIG. 9 is a schematic diagram illustrating an external stimulus applied to a force sensor.

FIG. 9 is a schematic diagram illustrating an external stimulus applied to a force sensor apparatus 1000. As shown in FIG. 9, a linear external stimulus 1001 applies force to the brackets or supports 1018 via the sensor housing or frame. The brackets or supports 1018 are mechanically coupled to the individual sensor elements 1006, e.g., piezoelectric crystal transducers.

The inertial resistance of the test mass 1002 resists the external force or stimulus 1001, and a shear stress develops across each pair of transducers 1006 positioned to respond to the external force 1001. When the crystal response (piezoelectric voltage output) is summed for the transducers 1006 on each side of the mass 1002, the selected crystal orientation and polarity conventions result in a signal proportional to the acceleration amplitude, due to the external stimulus being applied along the selected sensing axis. The off-axis sensors have minimal response, due to the mechanical design of sensor apparatus 1000 providing suitable compliance within the crystal mount relative to the frame, as described herein.

As shown in FIG. 9, each transducer 1006 is sandwiched between the test mass or body 1002 (shown as elliptical for convenience) and the adjacent bracket or support member 1018. A mechanical positive (or positive response) mark 1034 is shown for each of the two transducers 1006, and these can be aligned on the same end of each crystal. The transducers 1006 can also be mounted to the mass 1002 with the negative or common electrodes placed against and/or in electrical contact with the outer surface of the mass 1002, and with the positive electrodes oriented against and/or in electrical contact with the support brackets 1018.

In some examples, the mass 1002 can comprise a conductive metal or include a metal-plated surface defining an equipotential, which is electrically connected to the common (negative) electrodes of each transducer 1006 in sensor 1000, and which can be electrically tied to a common ground as shown in FIG. 9. The representative electrical diagram 1050 illustrates an equivalent circuit, showing the electrical polarity of the transducers 1006 and the ground connection. The polarity and mechanical positive conventions are merely representative, however, and may be interchanged for any or all of the transducers 1006, without loss of generality.

For a linear accelerometer sensor 1000, when an acoustic plane wave or other suitable external impulse 1001 travels along a designated positive sensing axis, the sensor 1000 generates a positive signal responsive to the resulting shear stress on the transducers 1006. The shear stress is induced by the inertial resistance of mass 1002, which is fixed to one face of each transducer 1006, relative to the external stimulus 1001 transmitted onto the support brackets 1018, which are fixed to the opposing surfaces of the transducers 1006. The body of the mass 1002 and the support brackets 1018 push and pull on the opposing faces of the transducer 1006, generating shear stress.

When the acoustic wave travels in the opposing direction to the sensor's positive sensing axis, a negative output is produced. The wave propagation direction thus defines the signal polarity for each linear sensor axis. In response to the linear mechanical stimulus, the crystals are subject to shear forces that generate a like-polarity signal. The equivalent circuit 1050 in FIG. 9 indicates that in this particular configuration the electrical response, $V_R$, is equal to the sum of the voltage outputs XTAL1 and XTAL2 of the two transducer crystals 1006.

Rotational Response

The three linear sensor axes X, Y, Z can be orthogonally arranged, e.g., with the positive polarity orientation of axis each satisfying the right-hand rule (see FIG. 2). For a rotational acceleration sensor, motion acting on a coupled pair of piezoelectric crystal transducers 1106 will have a positive polarity, as defined in a clockwise direction around the common axis, viewed through the plane of the motion and along the positive axis normal to the plane. Described another way, looking down from the positive end of the axis normal to the plane of rotation, the motion acting on a coupled pair of sensors will have a positive polarity and proceed in a counter-clockwise direction around the axis. Alternatively, the sign convention can be reversed, without loss of generality.

Figure 10A:
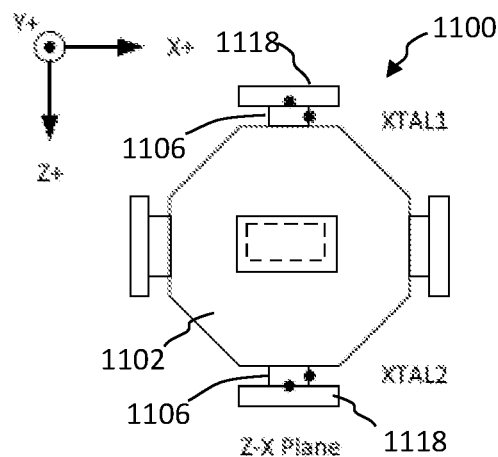
FIG. 10A is a schematic diagram illustrating the orientation and translational response of a set of transducers positioned about a test mass in the X-Z plane.
Figure 10B:
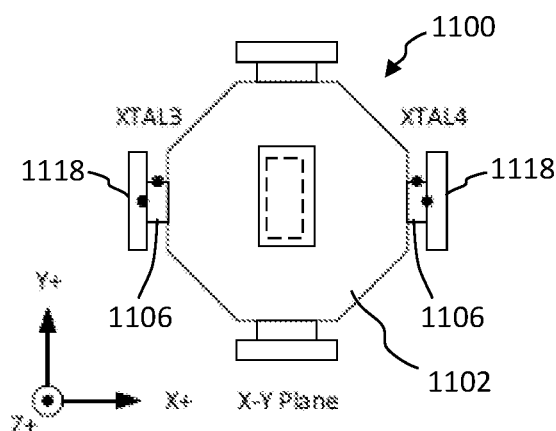
FIG. 10B is a schematic diagram illustrating the orientation and translational response of a set of transducers positioned about a test mass in the X-Y plane.

FIG. 10A is a schematic diagram illustrating the orientation and translational response of a sensor 1100 with a set of transducers 1106 attached to support brackets 1118 positioned about a test mass 1102 in the X-Z (or Z-X) plane. FIGS. 10B and 100 are schematic diagrams illustrating the orientation and translational response for transducers 1106 positioned in the X-Y and Y-Z planes, respectively. FIG. 10D is a schematic diagram illustrating the response and electrode polarity convention for a representative transducer 1106.

FIG. 10A depicts the orientation of a first pair of transducers 1106 positioned about the mass 1102 in the X-Z or Z-X plane, and the direction of positive translational response to an external force. The electrode connection and corresponding polarity of the voltage output are indicated by the stress and electrode parity markings (dots), using the positive response and electrode marking convention of FIG. 10D.

Figure 10C:
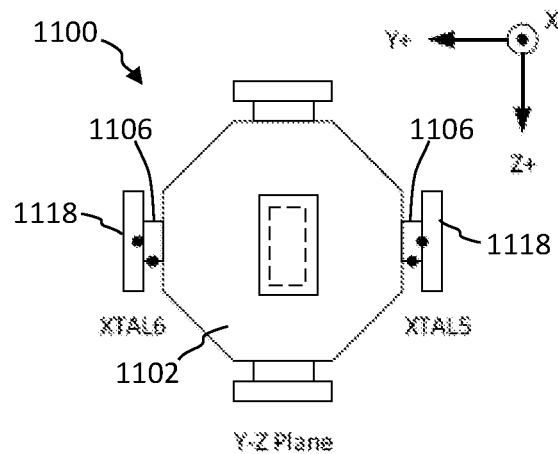
FIG. 10C is a schematic diagram illustrating the orientation and translational response of a set of transducers positioned about a test mass in the Y-Z plane.
Figure 10D:
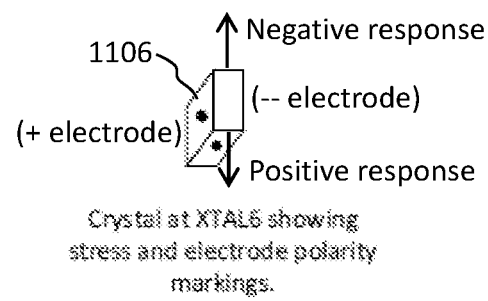
FIG. 10D is a schematic diagram illustrating the response and electrode polarity convention for a representative transducer.

FIGS. 10B and 10C use the same marking convention. FIG. 10B depicts the orientation of a second pair of transducers 1106 positioned about the mass 1102 in the X-Y plane, and FIG. 10C depicts the orientation of a third pair of transducers 1106 positioned about the mass 1102 in the Y-Z plane.

Figure 11:
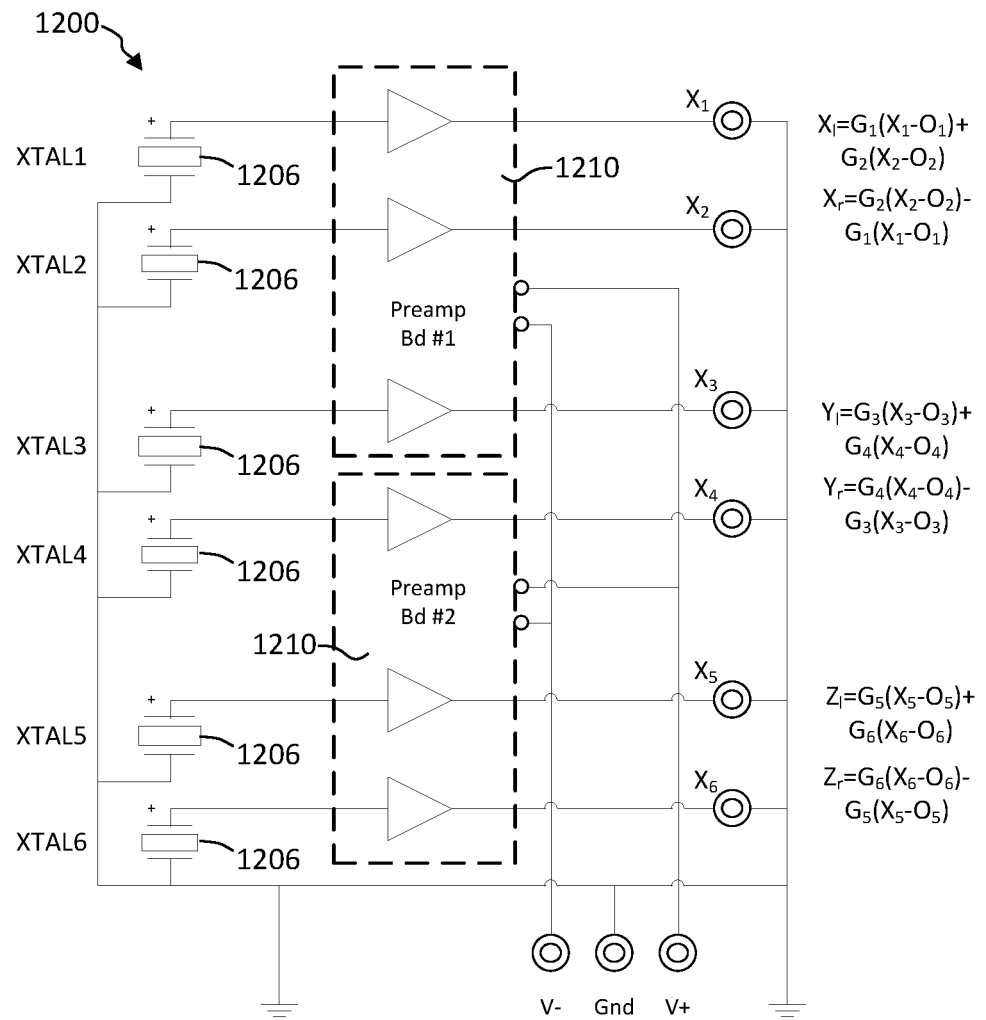
FIG. 11 is a representative schematic wiring diagram for a set of transducers in a multi-axis, single mass seismic sensor.

FIG. 11 is a representative wiring diagram for a set of piezoelectric transducers or sensor elements 1206 in a multi-axis, single mass seismic sensor apparatus 1200. FIG. 11 is a simplified schematic denoting the wiring of the preamp boards 1210 and channels X1-X6 for the transducers 1206, as provided in various embodiments of a multi-axis, single mass acceleration sensor 1200. In some embodiments, an integrated preamp/digitizer may be placed behind the buffer preamp. In additional embodiments, a post-digitization processor for gain adjust and offset removal may be used before forming the final linear and rotational motion output signals, e.g., via digital summation and differencing.

In some configurations, the multi-axis, single mass acceleration sensor 1200 may have six motion sensor responses: three orthogonal linear acceleration responses, and three rotational acceleration responses. The linear and rotational acceleration responses for each axis (designated $X_l$, $X_r$; $Y_l$, $Y_r$; and $Z_l$, $Z_r$, respectively) are formed from the sum and difference signals obtained by the corresponding pairs of flex-shear single-crystal transducers 1206, as shown in FIG. 11. Each of the three pairs of transducers 1206 can be positioned along a different one of the three orthogonal sensing axes X, Y, Z, which extend through the center of mass of the (single) test body, as described above.

The responses of the opposing pairs of individual transducers 1206, after buffering and digitizing, may be summed or differenced to generate the linear or rotational acceleration responses. A sign convention determines whether the linear and rotational outputs are derived by summing or differencing the opposing crystal pairs. For particular design purposes, the linear response signal can generated by summation of the opposing crystal responses, e.g., by determining the mechanical orientation of each crystal as shown above in FIGS. 10A-10C. As a consequence, the difference of the opposing crystal responses can be used to generate the rotational acceleration response. The sign convention is however arbitrary, and can be reversed without loss of generality.

Signal Generation

This section defines selected formulae and algorithms for calculating and generating simple representative linear and rotational outputs for an exemplary multi-axis, single mass acceleration sensor. These relatively straightforward examples do not necessarily include full three-dimensional orientation adjustment terms, for example as may be derived from a formal calibration process, but such corrections are contemplated within the scope of the disclosure.

In the first-order mathematical expressions below, the buffered transducer signals are represented by $v_1$-$v_6$. The offset adjustments are represented by $o_1$-$o_6$. The particular values of the gain adjustments vary from embodiment to embodiment. In particular, these specific values merely a suitable indicate the range of variability for linear and rotational signals, in particular configurations of a multi-axis, single mass seismic sensor. More generally, these values vary based on transducer response, electronics configuration, and other factors.

TABLE 1

Linear Response

| Axis | Linear Response | Equation No. |
|---|---|---|
| X | $X_l = \left(\frac{1}{2A_{l1}}(v_1 - o_1) + \frac{1}{2A_{l2}}(v_2 - o_2)\right)$ | [1] |

TABLE 1-continued

Linear Response

| Axis | Linear Response | Equation No. |
|---|---|---|
| Y | $Y_l = \left(\frac{1}{2A_{l3}}(v_3 - o_3) + \frac{1}{2A_{l4}}(v_4 - o_4)\right)$ | [2] |
| Z | $Z_l = \left(\frac{1}{2A_{l5}}(v_5 - o_5) + \frac{1}{2A_{l6}}(v_6 - o_6)\right)$ | [3] |

TABLE 2

Rotational Response

| Axis | Rotational Response | Equation No. |
|---|---|---|
| X | $X_r = \left(\frac{1}{2A_{r6}}(v_6 - o_6) - \frac{1}{2A_{r5}}(v_5 - o_5)\right)$ | [4] |
| Y | $Y_r = \left(\frac{1}{2A_{r2}}(v_2 - o_2) - \frac{1}{2A_{r1}}(v_1 - o_1)\right)$ | [5] |
| Z | $Z_r = \left(\frac{1}{2A_{r4}}(v_4 - o_4) - \frac{1}{2A_{r3}}(v_3 - o_3)\right)$ | [6] |

TABLE 3

Parameters

| Symbol | Description |
|---|---|
| $x$ | Subscript referring to the crystal number, where x is a number from 1 to 6 |
| $O_x$ | Offset, net of all sources prior to digitization, of Xtal x, in units of volts |
| $V_x$ | Voltage, net of crystal and preamp, of Xtal x, in units of volts |
| $A_{lx}$ | Scale Factor, linear motion, net of crystal and preamp, of Xtal x. Scale Factor implicitly includes the crystal sensitivity and the preamp gain. Units of V/m/s$^2$ |
| $A_{rx}$ | Scale Factor, rotational motion, net of crystal and preamp, of Xtal x. Scale Factor implicitly includes the crystal sensitivity and the preamp gain. Units of V/rad/s$^2$ |

EXAMPLES

A seismic data acquisition system may utilize a sensor station with one or more seismic sensors, where the seismic sensors include any number and combination of hydrophones, geophones, accelerometers, or the like. Such a system can include a multi-axis, single mass accelerometer, e.g., implemented as a six-component seismic sensor configured for measuring three degrees of freedom in linear motion along three independent directions and three degrees of freedom in rotation about three independent axes. In some of these embodiments, the sensor is provided with three pairs of accelerometers or similar piezoelectric sensors coupled to a single test mass, and arranged along independent or orthogonal axes.

The resonance of such a multi-axis, single mass accelerometer can be one or more orders of magnitude higher than other sensors (e.g., a typical particle acceleration sensor), which enables a reasonable implementation of a high-cut mechanical shock system while maintaining flat response within a selected seismic frequency band of interest. The accelerometer may incorporate directional sensing by configuring the crystals and beams in unique orientations, and/or by attaching to the crystals with supports that are "stiff" along the principal axis of sensing and "soft" along the cross axes. One objective that can be met by such a configuration is to reduce or minimize distortion in the frame, while enhancing or maximizing shear stress in the crystal along the primary sensing direction.

In any of the examples and embodiments described herein, a seismic sensor can comprise a frame and a central mass disposed within the frame, the central mass having three principal axes. A plurality of transducers can be mechanically coupled between the frame and the central mass. The transducers can be arranged in three pairs, with the transducers in each pair coupled to opposing sides of the central mass, as defined along the three different principal axes.

Each of the transducers may have a crystal orientation defining a shear sensitivity, with the shear sensitivity of the transducers in each pair being oriented generally parallel to one another, and substantially perpendicular to the respective principal axis. For example, the shear sensitivities of the three pairs of transducers can be oriented in mutually perpendicular directions. The mutually perpendicular directions can correspond to the principal axes, but the shear sensitivity of each pair is perpendicular to the principal axis along which that pair is disposed, and thus parallel to another of the three principal axes, along which a different pair of the transducers is disposed.

The frame or housing may comprise a plurality of side frame members arranged in pairs on the opposing sides of the central mass, as defined along the three principal axes, with the transducers being coupled to the side frame members in each the respective pair. A plurality of isolation members can be disposed between the side frame members at corners thereof, where the isolation members are configured for suppressing shear load transfer between the respective side frame members.

A beam can be disposed along a central portion of each side frame member, with the beam configured for coupling to the respective transducer, opposite the central mass. Such a beam may have a non-uniform cross section defining a relatively higher stiffness along a primary sensing direction of the respective transducer (e.g., as defined by the crystal orientation, with shear sensitivity perpendicular to the respective principal axis), and a relatively lower stiffness perpendicular to the primary sensing direction (e.g., along the respective principal axis).

Alternatively, one or more rods can be coupled to each side frame member, and disposed across an aperture formed in a central region of the side frame member. The one or more rods can be configured to couple the respective transducer to the corresponding side of the frame, e.g., with the rods extending along the primary sensing direction. The rods can also be configured to reduce shear load transfer perpendicular to the primary sensing direction.

In any of these examples and embodiments, the central mass may be conducting or have a conductive outer surface. Each of the transducers can be electrically coupled to the conductive outer surface, in order to define a common terminal potential. For example, each of the transducers can be oriented with a negative electrode side disposed toward the conducting surface of the central mass, and all of the negative electrodes can be connected to the conducting sphere to define a common ground.

Sensor electronics can be configured to combine signals of the transducers in each pair, in order to generate an output characterizing acceleration of the frame in a direction perpendicular to the corresponding principal axes. Similarly, the sensor electronics can be configured to combine signals of the transducers in each pair to generate an output characterizing rotation of the frame about the respective principal axes. Depending on electrode and response convention for the selected transducer crystal orientation, the signals can be combined by summing to generate the (linear) acceleration output, and combined by subtraction to generate the rotational acceleration output, utilizing suitable preamplifier electronics, gain factors and other parameters.

A sensor apparatus according to any of the above embodiments and examples may comprise a modular housing assembly having one or more components configured for deployment in a water column. A seismic sensor can be provided in the modular housing, with the seismic sensor comprising a central mass disposed within a frame and a plurality of transducers mechanically coupled between the frame and the central mass. The transducers can be arranged in pairs coupled to opposing sides of the central mass, with the opposing sides defined along the three principal axes of the central mass.

Sensor electronics can be configured to generate output by combining the signals of the transducers in each pair, with the output characterizing a seismic wavefield propagating through the water column. For example, a first (e.g., additive) combination of the signals may be responsive to acceleration in a sensing direction perpendicular to the principal axis along which the pair of transducers is coupled to the mass. Conversely, a second (e.g., subtractive) combination of the signals may be responsive to rotation about the principal axis along which the pair of transducers is coupled to the mass.

Alternatively the sign convention can be reversed, e.g., based on the transducer crystal orientation, the electrode coupling convention, and other electronic signal processing components. For example, each pair of the transducers may have a crystal orientation defining a shear sensitivity along the sensing direction, with the shear sensitivities of individual transducers within a pair oriented in a generally parallel direction, and the shear sensitivities of different pairs of the transducers being oriented in mutually perpendicular directions.

The frame may comprise a plurality of side frame members arranged on the opposing sides of the central mass. A plurality of isolation members can be disposed between the side frame members, and configured for reducing shear load transfer between the sides of the frame. The frame may also comprise a plurality of sides disposed about the central mass along the principal axes, with each of the sides coupled to a respective one of the transducers, opposite the central mass. The sides (or side frame members) can be configured to provide a relatively higher stiffness along the sensing direction of the respective transducers, and a relatively lower stiffness perpendicular to the respective sensing direction (e.g., along the corresponding principal axis of the mass).

The central mass can be formed of a conducting material, or a conductive outer surface can be provided on the central mass. Each of the transducers can be electrically coupled to the conductive outer surface, in order to define a common terminal potential.

A clock circuit can be configured to provide a timing signal corresponding to the output of the sensor electronics, and memory can configured to store the output and corresponding timing signal. In sensor station and seismic node embodiments, the clock and memory can be disposed within the modular housing, together with the seismic sensor and the sensor electronics. The sensor apparatus may further comprise a power supply configured for providing power to the electronics, the clock circuit, the memory and the sensor electronics. A depth sensor can be configured to control the power supply, based on a depth of the sensor apparatus in the water column. The modular housing can be substantially unitary, or formed of separate modular components joined together, with the seismic sensor, sensor electronics, clock circuit, memory, power supply, depth sensor and other internal components disposed in the same or different modular components of the housing.

Suitable methods of forming or assembling such a seismic sensor or sensor apparatus include providing an alignment jig and disposing a mass on a base of the alignment jig, where the mass defines three orthogonal axes. A plurality of transducers can be disposed on the jig adjacent the mass, the transducers arranged in pairs on opposing sides of the mass, along at least two of the orthogonal axes. The transducers can be aligned with the jig, where each pair of transducers defines a primary sensing direction oriented perpendicularly to the respective axis. The transducers can also be bonded to the mass, where the jig retains each of the transducers in alignment along the respective primary sensing direction.

Alternatively, each of the steps may be performed independently, without the alignment jig, for example using other alignment tools. Depending on sensor and jig design, disposing the mass on the base of the alignment jig can include inserting the mass into a port defined in the base, with the port configured to align the mass with respect to the orthogonal axes. Disposing the plurality of transducers adjacent the mass can comprise inserting the transducers into slots defined adjacent the port in the base of the jig, with the slots configured to align the transducers to define the respective primary sensing directions perpendicularly to the corresponding orthogonal axes.

A frame can also be disposed on the jig, where the sides of the frame are aligned with respect to the three orthogonal axes. The plurality of transducers can be bonded to the frame, where the transducers are bonded between the mass and the respective sides. Selected methods of assembly can also include inserting pins into the base, where the pins are configured to hold one or both of the mass and the frame in position during a simultaneous curing operation, for boding the plurality of transducers to one or both of the mass and the frame at substantially the same time.

Additional combinations are also encompassed. For example, the sensor station may include one or more of a scalar pressure sensor and a three component (3C) sensor configured to measure three spatial components of seismic waves, e.g., one or more micro electro mechanical system (MEMS) accelerometers or piezo-electric sensors. One or more additional components can also be included in the sensor station, for example a timing device or circuit configured to generate a clock signal, memory configured to store seismic data from the sensors, an energy source configured to provide power to the sensors, and other electronic components.

The system may include one or more depth or pressure sensors configured to determine a depth of the seismic sensor station during deployment and/or retrieval. During deployment, one or more sensors, memory and other circuits or electronic components of the seismic sensor station may not be powered until a threshold depth is reached, e.g., as measured by the depth or pressure sensors. When the threshold depth is reached, one or more of the circuits or electronic components of the seismic sensor station can also be powered down.

By selectively powering one or more such circuits or electronic components of the seismic sensor station during deployment and/or retrieval, the sensor station can conserve power and extend operational lifetime. In particular, the operation lifetime of the seismic sensors and/or station can be extended during operations to record seismic data, as compared to such a system without the capability for selectively powering on and off one or more circuits or electronic components, whether based on depth, timing, or another operational parameter.

In some examples the seismic sensor station is formed with a single integrated housing, and all circuits or electronic components of the sensor station are contained within the housing. The seismic sensor station can also be configured to be deployed via a rope, for example with the housing having a passage defined therethrough and configured for receiving the rope, or using a clamp or other coupling mechanism configured to facilitate connection to the rope.

A seismic survey apparatus can include two or more such sensor stations or nodes, as described herein. A method for deploying the sensor stations in a seismic survey apparatus can be implemented by disposing the stations along a rope or wire, or via a remotely or autonomously operated vehicle, or using autonomous propulsion systems. Additional methods are encompassed for towing such a seismic survey apparatus behind a vessel.

Methods for seismic data acquisition include operating such a seismic data acquisition system, as described herein. A non-transitory computer-readable data storage medium can also be provided with program code embedded thereon, where the program code is executable on a computer processor to execute such a method for seismic data acquisition by operating a seismic data acquisition system as described herein.

Shear Suppression and Enhancement

An autonomous sensor system can be configured according to any of the above examples, with the system having one or more of a first sensor, a second sensor, and/or a third sensor comprising one or more of a hydrophone, a three component geophone and a shear free sensor capable of recording seismic signals absent substantial distortion from shear waves. For example, such an autonomous sensor system may include one or more of the sensors enclosed in a region or housing with an acoustic impedance similar to that of surrounding water, so that acoustic signals travelling through the water are transferred to the sensors therein with minimal reflection.

The exterior of the housing can include or be formed as a perforated, rigid housing covered with a flexible, acoustically transparent skin. The interior of the housing can be filled with a fluid, where the skin and fluid both have acoustic impedances substantially equal to that of surrounding water or seawater. At least one of the sensors can be suspended in the fluid, so that the suspended sensor is partially or substantially isolated from motion of the housing of the autonomous sensor system, thereby shielding the sensor from shear noise transferred via the housing.

An autonomous sensor system can be provided according to any of the above examples, where the outputs of one or more of the sensors are combined to generate a combined seismic signal. Such a combined signal may substantially reject ghosting and multiple effects, and the combined signal can either be separately recorded or further combined with output of one or more others of the sensors. The output of a single, vertical component sensor can be utilized to remove or reduce or lessen impact of shear noise in the vertical or horizontal components of another of the sensors, either by itself or in combination with the output of one or more additional sensors such as a hydrophone.

Recorded shear energy can be isolated to determine properties of subsurface structure based on the shear energy. The shear energy may preferably be isolated by combining outputs of the sensors, and further preferably by one of the sensors recording both shear waves and pressure waves and another of the sensors recording only pressure waves, still further preferably with one or more such outputs being subtracted to isolate the shear energy.

Such a sensor apparatus can also provide both linear and rotational measurements. The rotational measurements can provide substantially pure shear data, and having both rotational and translational data allows for the computation of derivatives of the wave field. Such calculations can provide for removal of shear contamination from ocean-bottom node (OBN) data, as well as improved interpolation of primary or pressure wave (P-wave) and secondary of shear-wave (S-wave or PS-wave) data, thereby making deep-water node C-wave (PS-wave or converted wave) surveys viable.

An autonomous shear-free or reduced-shear sensor system can be configured for any of the above examples, the sensor including an external or outer housing and an internal housing suspended in a shear absorbing fluid or medium within the external housing, the specific gravity of the internal housing and the shear absorbing medium preferably selected to be substantially similar to facilitate suspending the inner housing in the fluid or gel within the outer housing. The external housing can be designed such that shear energy is dispersed or dissipated at the housing, whereas pressure waves are transmitted through the housing with substantially minimal attenuation. The external housing can also comprise a perforated, rigid housing component covered with a flexible, acoustically transparent skin, the pressure waves can travel through both the external housing and the shear absorbing medium, the medium can comprise sea water or gel, and/or the waves can be recorded by a geophone formed within the inner housing.

A sensor system can be configured for any of the above examples, with any one or more of the sensors implemented in the form of a single mass accelerometer as described herein. Similarly, any one or more of the sensors may be configured as a six component sensor, as described herein. Moreover, any one or more of the sensors can be configured as a single mass sensor for independently measuring compressional energy as well as shear energy, e.g., in one, two or three different orthogonal directions.

Unless specifically indicated, all references to geophones utilized in the invention include conventional geophones as well as other known devices for detecting seismic wave activity or directional sensors, including without limitation, accelerometers, and references to accelerometers likewise include other directional sensors, including, without limitation, geophones. While the foregoing is directed to embodiments of the present invention, other and further embodiments of the invention may be devised without departing from the basic scope thereof, and the scope thereof is determined by the claims that follow.

While this invention is described with respect to particular exemplary embodiments, it is understood that changes can be made and equivalents may be substituted to adapt the disclosure to different problems and application, while remaining within the spirit and scope of the invention as claimed. The invention is not limited to the examples that are described, but encompasses all embodiments falling within the scope of the appended claims.

The invention claimed is:

1. A multi-axis acceleration sensor comprising:
a frame;
   a central mass disposed within the frame; and
   a plurality of transducers mechanically coupled between the frame and the central mass;
   wherein at least a first set of the transducers are arranged between the frame and the central mass in a manner configured to measure translational and rotational motion with respect to a first axis.

2. The multi-axis acceleration sensor of claim 1, wherein the frame is a three dimensional frame.

3. The multi-axis acceleration sensor of claim 1, wherein the first set of transducers is configured to measure rotation around the first axis.

4. The multi-axis acceleration sensor of claim 3, further comprising one or both of the following:
a second set of transducers arranged between the frame and the central mass in a manner configured to measure rotation around a second axis; and
a third set of transducers arranged between the frame and the central mass in a manner configured to measure rotation around a third axis.

5. The multi-axis acceleration sensor of claim 1, further comprising:
at least a first of the transducers configured to measure translation in a first direction parallel to or along the first axis;
at least a second of the transducers configured to measure translation in a second direction parallel to or along a second axis; and
at least a third of the transducers configured to measure translation in a third direction parallel to or along a third axis.

6. A multi-axis acceleration sensor comprising:
a frame;
a central mass supported within the frame; and
a plurality of transducers coupled between the frame and the central mass;
wherein the frame is more rigid or stiffer along a principal axis for sensing translational response of the transducers; and
wherein the frame is softer or less stiff along a non-sensing cross axis transverse to the principal axis.

7. The multi-axis acceleration sensor of claim 6, wherein the frame is
configured to increase or maximize sensitivity of transducers along the principal axis and to reduce or minimize cross axis influences, wherein off-axis response of transducers along the cross axis is substantially smaller than on-axis response of the transducers along the principal axis.

8. The multi-axis acceleration sensor of claim 6, wherein the multi-axis acceleration sensor is adapted to generate relatively higher mechanical shear stress on the transducers disposed along the principal axis and relatively lower mechanical shear stress on the transducers disposed along the cross axis, wherein the transducers produce relatively more voltage when stressed along a direction of the principal axis than along a direction of the cross axis.

9. The multi-axis acceleration sensor of claim 6, wherein the frame has a non-uniform cross section defining a relatively higher stiffness along a primary sensing direction of the transducers along the principal axis and a relatively lower stiffness along the cross axis perpendicular to the primary sensing direction.

10. The multi-axis acceleration sensor of claim 9, further comprising one or
more rods coupled to each of a plurality of respective side frame members and disposed across an aperture formed therein, the rods configured to couple the transducers to corresponding side frame members along the primary sensing direction and to reduce load transfer perpendicular to the primary sensing direction.

11. The multi-axis acceleration sensor of claim 6, further comprising a conductive outer surface on the central mass, wherein each of the transducers is electrically coupled to the conductive outer surface to define a common terminal potential.

12. The multi-axis acceleration sensor of claim 6,
wherein the transducers are arranged in one or more pairs coupled to opposing sides of the central mass, the opposing sides defined along respective orthogonal axes through the central mass; and
further comprising sensor electronics configured to combine signals from the transducers in each pair and generate output representative of translational and rotational movement from the combined signals.

13. The multi-axis acceleration sensor of claim 12, wherein a first combination of the signals is responsive to acceleration in a sensing direction perpendicular to each respective axis along which each pair of the transducers is coupled to the central mass, and a second combination of the signals is responsive to rotation about each respective axis.

14. The multi-axis acceleration sensor of claim 12, wherein:
each pair of the transducers has a crystal orientation defining a shear sensitivity along a respective sensing direction; and
the shear sensitivities of different pairs of the transducers are oriented in mutually perpendicular directions.

15. A multi-axis accelerometer comprising:
a housing defining a three-dimensional enclosure;
a single mass body suspended within the enclosure defined by the housing; and
a plurality of force sensors physically attached to the single mass body at a plurality of locations and further physically attached to the housing, thereby suspending the single mass body within the enclosure.

16. The accelerometer of claim 15, wherein the single mass body is at least one of the following: centered within the enclosure, spherical, hollow, and electrically conductive.

17. The accelerometer of claim 15, wherein:
the housing is a monocoque structure:
the housing defines a plurality of apertures within the monocogue structure with each aperture positioned adjacent to a respective one of the force sensors: and
the accelerometer further comprises a plurality of rods fixed to the housing, wherein:
one or more of the rods are disposed across each respective aperture formed within the monocogue structure; and
the one or more rods coupled the respective transducer to the housing along a primary sensing direction and reduce load transfer between the single mass body and the housing perpendicular to the primary sensing direction.

18. The accelerometer of claim 15, wherein:
the housing is formed by a plurality of frames connected together about the single mass body; and
one or more rods are coupled to each frame and disposed across an aperture formed therein,
wherein the one or more rods are further configured to couple one of the plurality of force sensors to a corresponding frame along a primary sensing direction and to reduce load transfer perpendicular to the primary sensing direction.

19. The accelerometer of claim 18, wherein the frames forming the housing are electrically isolated from each other, mechanically isolated from each other, or both.

20. The accelerometer of claim 15, wherein:
the force sensors are each made of a single shear crystal:
the force sensors are arranged in opposing pairs;
each pair of the force sensors has a crystal orientation of the single shear crystals defining a shear sensitivity along a sensing direction; and
the shear sensitivities of different pairs of the force sensors are oriented in mutually perpendicular directions.

* * * * *